US007127866B2

(12) United States Patent
Diamond

(10) Patent No.: US 7,127,866 B2
(45) Date of Patent: Oct. 31, 2006

(54) METHOD OF REMOVING SHATTERED GLASS PANES DIVIDED BY CRACKS INTO SEPARATE PANE SECTIONS

(75) Inventor: Jeffrey H. Diamond, Palm Beach, FL (US)

(73) Assignee: Aranar, Inc., West Palm Beach, FL (US)

( * ) Notice: Subject to any disclaimer, the term of this patent is extended or adjusted under 35 U.S.C. 154(b) by 0 days.

(21) Appl. No.: 10/961,063

(22) Filed: Oct. 12, 2004

(65) Prior Publication Data

US 2005/0081483 A1 Apr. 21, 2005

Related U.S. Application Data

(60) Division of application No. 10/059,272, filed on Jan. 31, 2002, which is a continuation-in-part of application No. 09/920,750, filed on Aug. 3, 2001.

(51) Int. Cl.
*C03C 27/10* (2006.01)

(52) U.S. Cl. ................ 52/745.15; 52/202; 52/DIG. 12; 52/514.5; 52/746.1; 52/741.41; 156/98

(58) Field of Classification Search .................. 52/514, 52/171.3, 514.5, 741.3, 741.4, 741.41, 742.13, 52/745.21, DIG. 12, 202, 127.1, 745.15, 52/746.1, 750; 65/28; 156/94, 71, 98, 108
See application file for complete search history.

(56) References Cited

U.S. PATENT DOCUMENTS

| | | | |
|---|---|---|---|
| 1,124,093 | A | 1/1915 | Woodruff |
| 1,239,089 | A | 9/1917 | Day |
| 1,428,955 | A | 9/1922 | Grossman |
| 1,736,879 | A | 11/1929 | Gross |
| 2,020,256 | A | 11/1935 | Copeman |
| 2,212,726 | A | 8/1940 | Atwood |
| 2,784,114 | A | 3/1957 | Miller |
| 3,091,551 | A | 5/1963 | Robertson |
| 3,411,562 | A | 11/1968 | Garrett |
| 3,430,394 | A | 3/1969 | Johnston |
| 3,455,865 | A | 7/1969 | Bolt et al. |
| 3,480,069 | A | 11/1969 | Handwerker |
| 3,486,918 | A | 12/1969 | Motter |
| 3,549,448 | A | 12/1970 | Dearing |
| 3,551,234 | A | 12/1970 | Britton |
| 3,830,760 | A | 8/1974 | Bengtson |

(Continued)

FOREIGN PATENT DOCUMENTS

| | | |
|---|---|---|
| DE | 2 608 728 A1 | 9/1976 |

(Continued)

*Primary Examiner*—Carl Friedman
*Assistant Examiner*—Phi Dieu Tran A

(57) ABSTRACT

A stabilized window structure and method for stabilizing a window structure having a window frame entirely or substantially entirely devoid of glass includes a patch removably secured over the window frame to cover the opening in its entirety and a body of unifying material disposed over and bonded to the patch to form a cohesive mass therewith. Alternatively, a pre-formed, polymeric foam panel is removably secured over the window frame to cover the entirety of the opening. A method of removing a shattered window pane involves using pre-existing cracks in the pane to define the formation of separately removable, disconnected cohesive masses. A method of removing shards from a track of a window structure involves removing the shards as part of a single cohesive mass, as pieces of a single cohesive mass or as separate, disconnected cohesive masses.

7 Claims, 11 Drawing Sheets

U.S. PATENT DOCUMENTS

| | | | |
|---|---|---|---|
| 3,926,470 | A | 12/1975 | Marcus |
| 4,010,311 | A | 3/1977 | Lewis et al. |
| 4,019,557 | A | 4/1977 | Earley |
| 4,045,269 | A | 8/1977 | Voss et al. |
| 4,075,386 | A | 2/1978 | Willdorf |
| 4,075,802 | A | 2/1978 | Gross et al. |
| 4,091,142 | A | 5/1978 | Elmore et al. |
| 4,098,035 | A | 7/1978 | Bessler |
| 4,145,855 | A | 3/1979 | Sheldon |
| 4,152,877 | A | 5/1979 | Green |
| 4,193,243 | A | 3/1980 | Tiner |
| 4,200,478 | A | 4/1980 | Jacino |
| 4,285,183 | A | 8/1981 | Condit |
| 4,352,262 | A | 10/1982 | Edelman et al. |
| 4,513,548 | A | 4/1985 | Parker |
| 4,596,725 | A | 6/1986 | Kluth et al. |
| 4,616,456 | A | 10/1986 | Parker |
| 4,636,425 | A | 1/1987 | Johnson et al. |
| 4,636,543 | A | 1/1987 | Helton |
| 4,809,478 | A | 3/1989 | Bernard |
| 4,859,491 | A | 8/1989 | Yan |
| 4,889,754 | A | 12/1989 | Vargas |
| 4,919,483 | A | 4/1990 | Horkey |
| 4,971,130 | A | 11/1990 | Bentley |
| 5,004,632 | A | 4/1991 | McGarvey et al. |
| 5,020,288 | A | 6/1991 | Swensen |
| 5,095,639 | A | 3/1992 | Slavin, Jr. |
| 5,107,643 | A | 4/1992 | Swensen |
| 5,121,957 | A | 6/1992 | O'Shea |
| 5,143,949 | A | 9/1992 | Grogan et al. |
| 5,156,853 | A | 10/1992 | Werner et al. |
| 5,186,978 | A | 2/1993 | Woodhall et al. |
| 5,194,299 | A | 3/1993 | Fry |
| 5,230,738 | A | 7/1993 | Wheeler |
| 5,234,325 | A | 8/1993 | Hill |
| 5,281,436 | A | 1/1994 | Swidler |
| 5,302,413 | A | 4/1994 | Woodhall et al. |
| 5,362,786 | A | 11/1994 | Woodhall et al. |
| 5,411,760 | A | 5/1995 | Woodhall et al. |
| 5,468,538 | A | 11/1995 | Nameche |
| 5,476,340 | A | 12/1995 | Contrasto |
| 5,484,820 | A | 1/1996 | Mispreuve et al. |
| 5,523,117 | A | 6/1996 | Woodhall et al. |
| 5,538,779 | A | 7/1996 | Mispreuve et al. |
| 5,603,190 | A | 2/1997 | Sanford |
| 5,618,582 | A | 4/1997 | VanWinckel |
| 5,622,093 | A | 4/1997 | Hutchins |
| 5,635,116 | A | 6/1997 | Einiger et al. |
| 5,687,528 | A | 11/1997 | Rouch |
| 5,739,191 | A | 4/1998 | Woodhall et al. |
| 5,866,260 | A | 2/1999 | Adams, Jr. et al. |
| 5,902,198 | A | 5/1999 | Martin et al. |
| 5,918,430 | A | 7/1999 | Rowland |
| 5,937,595 | A | 8/1999 | Miller |
| 5,937,596 | A | 8/1999 | Leeuwenburgh et al. |
| 5,943,832 | A | 8/1999 | Russell |
| 5,949,448 | A | 9/1999 | Man et al. |
| 5,960,603 | A | 10/1999 | Redden et al. |
| 6,063,477 | A | 5/2000 | Ames et al. |
| 6,067,819 | A | 5/2000 | Tanaka et al. |
| 6,233,972 | B1 | 5/2001 | Foster et al. |
| 6,352,299 | B1 | 3/2002 | Ames et al. |
| 6,474,035 | B1 | 11/2002 | Fara |
| 2002/0170248 | A1 | 11/2002 | Fara |

FOREIGN PATENT DOCUMENTS

| | | | |
|---|---|---|---|
| DE | 28 170 28 | A1 | 4/1978 |
| DE | 141 333 | | 4/1980 |
| EP | 1 031 699 | A1 | 2/1999 |
| GB | 1417153 | A | 12/1975 |
| GB | 2 124 687 | A | 2/1984 |
| GB | 2 208 073 | A | 2/1989 |
| JP | 1115982 | | 5/1989 |
| JP | 62264 | | 1/1992 |
| JP | 85459 | | 3/1992 |
| JP | 323437 | | 11/1992 |
| JP | 202620 | | 8/1993 |
| JP | 2001152678 | A | 11/1999 |
| JP | 2001-152678 | | 6/2001 |
| WO | WO 01/09475 | A2 | 2/2001 |

METHOD OF REMOVING SHATTERED GLASS PANES DIVIDED BY CRACKS INTO SEPARATE PANE SECTIONS

CROSS-REFERENCE TO RELATED PATENT APPLICATIONS

This application is a divisional of U.S. patent application Ser. No. 10/059,272 filed Jan. 31, 2002, which is a continuation-in-part of U.S. patent application Ser. No. 09/920,750 filed Aug. 3, 2001, the entire disclosures of the foregoing patent applications being incorporated herein by reference.

BACKGROUND OF THE INVENTION

1. Field of the Invention

The present invention generally relates to stabilizing window structures having shattered or missing glass panes and to safely removing shattered glass from window structures. More particularly, the present invention relates to stabilizing a window structure in which all or substantially all of the glass is missing therefrom, to safely removing glass shards from a track of a window structure, and to safely removing a shattered window pane as a plurality of separate sections using cracks in the window pane to define the separate sections.

2. Brief Discussion of the Related Art

Window structures are found in many various types of fabrications or constructions including buildings and vehicles, such as automobiles, buses, trucks, trains, planes, boats, ships and the like. Conventional window structures include one or more transparent window panes, typically made of glass or other breakable material, and a frame, which may be formed by a separate frame member or by a portion of the fabrication or construction itself, supporting the one or more panes. The panes of most window structures are susceptible to damage from many various sources; and, consequently, shattering, breaking or cracking of window panes is not uncommon. A window structure in which a pane is shattered, broken or cracked is unstable or destabilized since the damaged pane is prone to collapse or cave in, loose fragments or shards may fall or come loose from the pane, and the barrier or seal normally provided by the unbroken pane between the exterior and interior sides thereof is compromised. Fragments that actually fall or come loose from the pane present the risks of injury to individuals and damage to objects located exteriorly and/or interiorly of the window structure, particularly since the panes of window structures are most commonly made of glass. Where the shattered pane is in a window structure located at an elevated level or floor, pieces of the pane that fall exteriorly present a grave risk of harm to people and objects below, especially in urban areas. Compromise of the barrier or seal normally provided by the unbroken window pane presents the risk that the interior side will be undesirably exposed to environmental elements via cracks, fractures, fissures and/or holes in the pane. Accordingly, there is often a great sense of urgency to remove and replace shattered window panes immediately to eliminate the hazards presented when they are left in place for some time. In most cases, however, shattered window panes cannot be replaced immediately after they are broken; and, therefore, they must typically remain in place for some time while presenting an ongoing risk of harm until replacement can be accomplished. Although plywood is sometimes used to temporarily cover window structures in which the panes are damaged, plywood is heavy, typically fifty pounds for a single sheet, cumbersome, expensive, requires carpentry skill to install and is inconvenient to use. More specifically, plywood must typically be cut to fit the particular window and must be drilled and screwed into place so that the window frame and/or the fabrication or construction in which the window structure is installed may be damaged by the fasteners needed to secure the plywood in place. The drawbacks associated with the use of plywood are even greater when numerous damaged window structures are involved and/or when the damaged window structure is not easily accessible, such as when the damaged window structure is at an elevated level or floor.

The instability presented by a window structure having a shattered window pane makes safe removal of the pane difficult to accomplish. One common approach used by professional glass companies to remove shattered glass panes of window structures involves banging or smashing the panes with a hammer or other implement so that they fall to the exterior of the fabrications or constructions in which the window structures are installed. This "knock-out" approach tends to scatter glass fragments, and even tempered or laminated glass can produce many small fragments. When the glass fragments impact the ground or other objects, they may shatter even further and may damage the objects impacted thereby. Afterwards, significant additional labor is required for clean-up to collect and remove the glass fragments. Even when great care is exercised, however, potentially injurious glass fragments may be left behind due to the great difficulty associated with collecting small and/or widely scattered glass fragments. A further problem associated with the "knock-out" approach is that the glass usually splinters along the window frame such that shards are created along a track of the window structure, and these shards are dangerous and tedious to remove as described further below. Where the window structure is located at an elevated level or floor, the "knock-out" approach may be unacceptably dangerous. Another approach is to remove the shattered glass carefully by hand, piece by piece. The latter approach is dangerous, very time consuming, and messy, requiring the glass remover to work slowly and cautiously. Moreover, removing the glass pieces individually affords little control over preventing the shattered window pane from collapsing or caving in as the pieces are removed.

A further approach to dealing with shattered glass panes of window structures attempts to stabilize the window structures prior to removal of the panes. With this approach, the shattered glass panes are taped with adhesive tape to hold the panes together prior to removing them from the fabrications or constructions in which the window structures are installed. In order to keep a shattered glass pane intact, the adhesive tape must typically be applied to the entire or substantially the entire surface of the shattered glass pane. Applying the adhesive tape to the entire or substantially the entire surface of the shattered glass pane is laborious and time consuming, particularly where the glass pane is large. In addition, the tape must be pressed against the shattered pane in order to adhere the tape thereto, and such pressure or force can cause the pane to cave in or collapse and/or fragments to come loose therefrom. Even when the adhesive tape is carefully applied to the entire surface of the glass pane, fragments may still become detached from the tape and fall when the shattered pane is manipulated during removal.

A window structure is also unstable or destabilized where all or substantially all of the glass is missing therefrom. The barrier or seal normally provided by the unbroken glass is entirely lacking or is compromised, resulting in a great risk that the interior of the fabrication or construction and/or objects disposed therein will be damaged by environmental elements. In addition, the absence of all or substantially all of the glass from a window structure may present an opening large enough for a person, especially a child, to accidentally fall through. Plywood has been used on window structures to cover large holes until replacement panes can be installed, but has various drawbacks as noted above. A further instability arises in window structures in which an insubstantial amount of the window pane remains as shards disposed in a track formed in one or more mullions and/or the in the frame of the window structure. These shards protrude from the mullions and/or window frame and are potentially very injurious due to their exposed points and/or sharp edges. Moreover, the shards are difficult and time consuming to remove from the track, being typically removed individually by hand.

In vehicles, the panes of window structures, such as windshields, sliding windows, fixed windows and movable windows, are oftentimes shattered, cracked or broken due to impacts, such as those incurred during vehicular collisions or crashes. Plastic sheeting is sometimes taped over shattered vehicle windows to provide a barrier between the exterior and the interior of the vehicle; however, the use of tape is disadvantageous for requiring that pressure or force be applied to the window as discussed above. Shattered window panes in vehicles thusly present the same problems discussed above and also present additional problems in emergency situations where one or more passengers are trapped inside a vehicle. Where one or more passengers are trapped inside a vehicle, such as when the doors of the vehicle cannot be opened, it is often necessary to quickly remove a window pane to access the one or more passengers. In the case of automobiles, for example, it is often necessary to quickly remove a shattered front and/or rear windshield in order to access one or more passengers trapped inside. Where one or more trapped passengers are injured and require medical attention, reducing the time required to remove a vehicle window pane to access the one or more passengers is of the essence.

It is undesirable to remove broken window panes of vehicles by pushing the panes into the interior of the vehicles. The disadvantages of the latter approach are discussed above, and the latter approach is particularly undesirable where one or more passengers are trapped inside the vehicle, since the one or more passengers may be injured by fragments of the pane during and subsequent to entry of the fragments into the vehicle interior. An approach that has been used in emergency situations to remove shattered car windows involves applying adhesive tape to the exterior surface of a shattered window pane in order to enhance the integrity of the shattered window pane so that paramedics can pull it out of the car using handles created with the tape. As pointed out above, this procedure is usually time consuming and may cause the shattered window pane to cave in or collapse. The time that must be spent taping the shattered window pane represents time that an injured passenger goes untreated. In addition, caving or collapsing of the window pane into the vehicle interior may cause injury to the passengers therein.

The use of polymeric materials applied to glass for removal by peeling has been proposed, as represented by U.S. Pat. No. 3,455,865 to Bolt et al, U.S. Pat. No. 3,486,918 to Motter, U.S. Pat. No. 4,636,543 to Helton, U.S. Pat. Nos. 5,020,288 and 5,107,643 to Swenson, U.S. Pat. No. 5,143,949 to Grogan et al, U.S. Pat. No. 5,281,436 to Swidler, and U.S. Pat. Nos. 5,186,978, 5,302,413, 5,362,786, 5,411,760 and 5,523,117 to Woodhall et al. U.S. Pat. No. 3,830,760 to Benngston and U.S. Pat. No. 4,596,725 to Kluth et al are illustrative of one-component and two-component polyurethanes. None of the aforementioned patents contemplates the use of a cohesive or unifying material to stabilize a window structure in which all or substantially all of the glass is missing therefrom, to form a shattered pane into a cohesive mass allowing safe removal of the shattered pane as one or more relatively large pieces, to safely remove glass shards from a track of a window structure, or to safely remove a shattered window pane in a plurality of separate sections, corresponding to a plurality of separate cohesive masses, using cracks in the window pane to define the separate cohesive masses. Also, none of the aforementioned patents considers using a pre-formed panel of lightweight compressible material over a destabilized window structure to thereby impart stability to the window structure.

From the above, it should be appreciated that there is a great need for stabilized window structures and methods of stabilizing window structures in which all or substantially all of the glass is missing therefrom. There is also a need for methods of removing shattered glass from window structures wherein shattered window panes can be controllably removed as part of a single cohesive mass or as part of a plurality of relatively large, cohesive or integral masses, with the plurality of cohesive masses being formed by separating a single cohesive mass into separately removable pieces or by forming separately removable cohesive masses using pre-existing cracks of the shattered pane to define the separately removable cohesive masses. An additional need exists for lightweight, inexpensive, and easy-to-install pre-formed panels which may be used advantageously instead of plywood to impart stability to destabilized window structures. The need further exists for methods of removing glass shards from a track of a window structure wherein the shards are removed as part of one or more cohesive masses. Stabilized window structures and methods of stabilizing and removing shattered glass from window structures are needed which do not apply significant pressure or force to the glass and which are safe, efficient, easy to use, economical, and applicable to various types and sizes of windows installed in various diverse fabrications or constructions.

SUMMARY OF THE INVENTION

Accordingly, it is a primary object of the present invention to overcome the aforementioned disadvantages of prior approaches to stabilizing window structures in which the window panes are shattered or are partially or entirely missing and/or prior approaches to removing shattered glass from window structures.

Another object of the present invention is to remove a shattered pane of a window structure as one or more relatively large pieces of a cohesive mass.

A further object of the present invention is to remove a shattered pane of a window structure as a single cohesive mass, as pieces of a single cohesive mass or as a plurality of separately removable cohesive masses.

An additional object of the present invention is to form a shattered pane of a window structure into a single cohesive mass and to separate the single cohesive mass into pieces that are separately removable from the rest of the window structure.

A still further object of the present invention is to form a shattered pane of a window structure into a plurality of cohesive masses separated by one or more pre-existing cracks in the shattered pane so that the cohesive masses may be separately removed from the rest of the window structure.

Yet another object of the present invention is to stabilize shattered glass of a window structure without exerting significant pressure on the shattered glass which might cause the shattered glass to collapse and/or glass fragments to become loose from the window structure.

Yet a further object of the present invention is to impart stability to a destabilized window structure by installing a lightweight, inexpensive, and easily applicable pre-formed panel over the destabilized window structure.

An additional object of the present invention is to fill cracks, fractures and/or holes in a shattered pane of a window structure.

The present invention has as another object to use a patch and a cohesive or unifying material to fill a void created in a window structure due to glass being missing therefrom.

Yet a further object of the present invention is to safely and easily restore structural integrity to a shattered pane of a window structure prior to and during removal of the shattered pane.

An additional object of the present invention is to safely remove glass shards from a track of a window structure as a single cohesive mass, as pieces of a single cohesive mass or as a plurality of separately removable cohesive masses.

Some of the advantages of the present invention are that the risks of injury and/or damage presented by window structures having shattered window panes or window panes that are entirely or substantially entirely missing are greatly reduced; shattered panes of window structures can safely remain in place for some time prior to removal; window structures in which all or substantially all of the glass is missing can be stabilized prior to and while awaiting installation of replacement glass; the barrier or seal that is compromised in window structures having damaged or missing glass can be substantially or fully restored while allowing the damaged glass to be left in place; window structures can be stabilized and/or damaged glass removed therefrom in substantially less time and with substantially less labor than are required for other stabilizing and removal procedures; the cohesive or unifying material is easy to apply with only negligible pressure or force being exerted on the glass; formation of one or more cohesive or unified masses may be achieved in only a short time after the unifying material is applied; a shattered pane can be stabilized and removed quickly in one procedure, if desired; window pane shards can be removed quickly in one procedure; the unifying material may be used for stabilization and/or removal of shattered panes in emergency situations, such as where a shattered automobile window must be removed to extricate and/or access a passenger; crime scenes can be preserved using the present invention, particularly the preservation of a window pane shattered during the course of a crime and/or by a bullet; windows can be stabilized quickly following catastrophic events, such as earthquakes, explosions, crashes and the like, which may result in massive window damage; intact windows can be structurally reinforced quickly prior to predictable catastrophic events as well as during the occurrence of certain catastrophic events; the weight of the unifying material on the glass is insubstantial; the composition/compositions for the unifying material can be stored in small containers prior to use; the composition/compositions may be provided with a long shelf life; the unifying material can be applied by one person; the unifying material may be translucent so that light may pass therethrough; the unifying material may be applied to the exterior side and/or the interior side of a window structure; enhanced stabilization and protection may be achieved by applying the unifying material to both the exterior and interior sides; the unifying material will not lose its shape or protective qualities when exposed to environmental elements such as rain; the present invention fulfills unmet needs of emergency responders and do-it-yourself repairers as well as glass professionals; and, the methods of stabilizing and/or removing may be self-customized to optimize use in diverse situations.

The present invention is generally characterized in a stabilized window structure including a window frame circumscribing an opening entirely or substantially entirely devoid of glass so as to present a sizable hole, a patch removably secured over the window frame to cover the opening in its entirety, and a body of unifying material disposed over and bonded to an exterior side and/or an interior side of the patch to form a cohesive mass therewith. The cohesive mass stabilizes the window structure and may be left in place for some time prior to being removed from the window structure preparatory to installation of replacement glass. The unifying material may be a polymeric material, such as foam and non-foam polymeric materials, a cellulosic material or any other material capable of unifying with the patch. The unifying material may be applied to the patch in fluidic form, and dries, cures, sets, rigidifies or hardens to form the cohesive mass. The patch may include one or more patch members secured over the window frame adhesively, such as via an adhesive backing on the one or more patch members and/or via use of a separate adhesive including use of the unifying material as an adhesive. Any number of patch members can be utilized, with adjacent patch members overlapping one another or closely juxtaposed to one another to define one or more seams therebetween. Where one or more seams are defined between adjacent patch members, the seams are filled by the unifying material as it is applied. If desired or needed, a release element can be applied to the window structure to facilitate removal of the cohesive mass therefrom. One or more grasping members may be attached to the cohesive mass for grasping to assist removal of the cohesive mass. The one or more grasping members may be attached to the cohesive mass by securing the grasping members directly to the patch, and/or by inserting or embedding one or more portions of the one or more grasping members in the body of unifying material before the unifying material dries, cures, sets, rigidifies or hardens. Accordingly, upon the unifying material drying, curing, setting, rigidifying or hardening, the one or more grasping members are bonded or adhered to the cohesive mass so that the one or more grasping members may be used to manually pull the cohesive mass from the window frame.

The present invention is also generally characterized in a method of stabilizing a window structure having a window frame circumscribing an opening entirely or substantially entirely devoid of glass so as to present a sizable hole. The method comprises the steps of removably securing a patch over the window frame to cover the opening in its entirety, applying a body of unifying material over an exterior side and/or an interior side of the patch to form a cohesive mass therewith, and leaving the cohesive mass in place for a desired length of time to stabilize the window structure.

The present invention is further generally characterized in an alternative stabilized window structure including a window frame circumscribing an opening entirely or substantially entirely devoid of glass so as to present a sizable hole and a pre-formed panel of polymeric foam material removably secured over the window frame to cover the opening in its entirety. The pre-formed polymeric foam panel stabilizes the window structure and may be left in place for some time prior to being removed from the window structure preparatory to installation of replacement glass. The panel may be secured over the window frame adhesively, such as via an adhesive backing on the panel and/or via an adhesive applied to the window structure. Alternatively or additionally, one or more mechanical securing devices or fasteners can be used to removably secure the panel over the window frame. A release element, if needed, may be disposed over the window structure to facilitate removal of the panel from the window structure.

The present invention is additionally generally characterized in a method of stabilizing a window structure having a window frame circumscribing an opening entirely or substantially entirely devoid of glass so as to present a sizable hole. The method comprises the steps of removably securing a pre-formed polymeric foam panel over the window frame to cover the opening in its entirety and leaving the panel in place for a desired length of time to stabilize the window structure.

The present invention is still further generally characterized in a method of removing a window pane disposed in a window frame and having one or more pre-existing cracks dividing the window pane into a plurality of separate, disconnected window pane sections. The method comprises the steps of applying a body of unifying material to at least one of an exterior surface or an interior surface of each window pane section leaving the one or more cracks devoid of the unifying material, bonding the unifying material to each window pane section to form a cohesive mass for each window pane section including the body of unifying material and the window pane section bonded thereto, and removing the cohesive masses from the window frame separately from one another.

The present invention is yet further generally characterized in a method of removing window pane shards from a track of a window structure. The method comprises the steps of applying a body of unifying material over the shards, bonding the unifying material to the shards to form a cohesive mass therewith, and withdrawing the cohesive mass away from the track to remove the shards from the track as the cohesive mass is withdrawn. The body of unifying material can be applied to the shards as a band, strip, bead or any other suitable formation, and the cohesive mass can be withdrawn by pulling an end of the band, strip or bead. The shards can be removed as a single cohesive mass, as pieces of a single cohesive mass, or as separate, disconnected cohesive masses.

Other objects and advantages of the present invention will become apparent from the following description of preferred embodiments taken in conjunction with the accompanying drawings wherein like parts in each of the several figures are identified by the same reference characters.

DESCRIPTION OF THE PREFERRED EMBODIMENTS

Figure 1:
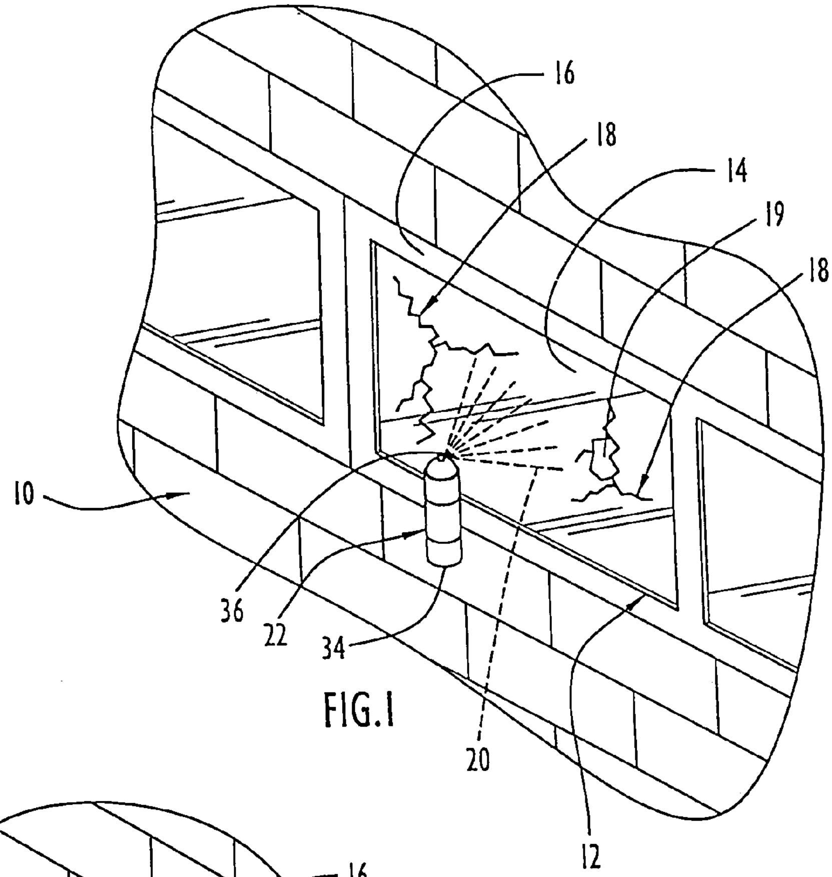
FIG. 1 is a broken, front perspective view of a building including a window structure having a shattered pane and showing a layer of unifying material being applied to an exterior surface of the shattered pane.

The present invention relates to the stabilization of window structures installed in fabrications or constructions such as buildings and vehicles. The present invention may be used on window structures of any type including one or more panes disposed in an opening circumscribed by a window frame. The opening and frame may form or be disposed in exterior or interior walls or doors of the fabrication or construction or may be free-standing, such as where the fabrications or constructions are showers, telephone booths, glass cubicles, tanks and the like. The window structure may include one or more tracks receiving a peripheral edge of the one or more window panes. The panes may be flat or planar or may have curved or other non-planar shapes or profiles. The window frame may be constructed separately from the fabrication or construction as a frame member including one or more parts, or may be formed integrally, unitarily with the fabrication or construction. As an example of the latter, the frame may be formed by a peripheral edge, border or surface of the fabrication or construction circumscribing the opening in which the one or more panes is/are installed, and this edge, border or surface can be provided with or without a trim or finish. The one or more tracks may be formed by or in the window frame and/or the fabrication or construction, and typically includes a groove receiving the peripheral edge of the one or more window panes. The window structure may include one or more vertical and/or horizontal mullions dividing the opening into separate sections, each receiving a window pane. In the latter case, the mullions may include tracks receiving peripheral edges of the window panes. The tracks can be made as separate pieces, or can be formed integrally, unitarily with the window frame, the fabrication or construction and/or the mullions. Representative window structures include sash windows, casement windows, sliding windows, sliding glass doors, slidably or pivotally movable windows, non-movable windows, fixed windows, movable windows, protruding windows, recessed windows and the like in fabrications or constructions of any type including but not limited to houses, stores, office buildings, banks, car dealerships, schools, museums, showers, telephone booths, cubicles, decorative and functional partitions, doors, tanks, aquariums, cars, trucks, buses, trains, boats, ships, submarines, planes and spacecraft. Fabrications and constructions to which the present invention applies include commercial, residential, governmental and recreational fabrications or constructions. The one or more panes will typically be made of glass, but may be made of any brittle material susceptible to being shattered, broken or cracked. Accordingly, the term "glass" as used herein should be considered illustrative only and is intended to encompass any type of window pane material. In addition, as used herein, "glass" is intended to include various types of glass including treated glass, untreated glass, tempered glass, laminated glass, single pane glass, double pane glass, etc.

FIG. 1 illustrates a building 10 having a window structure 12 including a glass window pane 14 mounted in a window frame 16. The window pane 14 is planar and is disposed in an opening of the building 10, with the frame 16 circumscribing the opening. The window structure 12 is shown in an exterior wall of building 10, but may form or be located in any exterior or interior component of building 10. The window pane 14 is shattered, broken or cracked, and has one or more cracks, fissures or fractures 18 therein, which may extend through the entire or less than the entire thickness of window pane 14. Depending on the severity of damage, the one or more cracks 18 may have broken the window pane 14 into individual fragments as shown by fragment 19. The cracks circumscribing fragment 19 extend through the entire thickness of pane 14 such that fragment 19 is separated from and not attached to the surrounding glass. Fragment 19 has not yet fallen or otherwise become loose from the remainder of the window pane 14, but is at risk of falling or otherwise becoming loose from the remainder of the window pane so as to leave a hole therein, particularly if force or pressure is applied to the window pane. Even where the damage to the window pane 14 has produced cracks without individual fragments, the shattered window pane 14 is nonetheless susceptible to collapsing or caving in due to its own weight and/or extraneous force or pressure thereon. The window structure 12 thusly presents a great risk that fragments or pieces of the window pane 14 will fall away from the window structure. Where fragments or pieces of the window pane 14 fall to the exterior of building 10, people and/or objects in the vicinity thereof may be injured, particularly where the window structure 12 is located at an elevated level or floor. Accordingly, the presence of shattered pane 14 is particularly problematic in urban areas, as are typically characterized by tall or high-rise buildings and significant pedestrian activity. The one or more cracks 18 also compromise the barrier or seal normally provided by the window structure 12 when the window pane 14 is unbroken. The one or more cracks 18 permit communication between the exterior and the interior sides of the window structure 12 such that environmental elements may reach the building interior. In addition, people and/or objects in the building interior may suffer harm in the event that fragments or pieces of window pane 14 fall into the interior of the building 10. Accordingly, the window structure 12 shown in FIG. 1 may be considered unstable or destabilized due to compromise of the structural integrity and/or compromise of the barrier or seal normally provided when the window pane 14 is not shattered, cracked or broken.

In accordance with the present invention, the window structure 12 is stabilized by applying a layer or body of cohesive or unifying material 20 to the shattered window pane 14 to adhere thereto and form the shattered pane into a cohesive mass. FIG. 1 illustrates unifying material 20 comprising a polymeric foam being applied in fluidic form to the exterior surface of the window pane 14 over cracks 18. However, the unifying material may be applied to the exterior surface and/or the interior surface of the window pane 14 depending on the location of the window structure, the accessability of the window structure, the extent of damage to the window pane and/or other factors. The unifying material 20 may be applied to the window pane 14 in any manner, but is preferably sprayed on the window pane as shown in FIG. 1 so that the force or pressure exerted on the window pane during the application process is minimized. In addition, the force or pressure on the window pane is insignificant due to the negligible weight and pressure exerted on the window pane by the unifying material during and after the application process. When the unifying material 20 is sprayed on the window pane 14 as shown in FIG. 1, the force or pressure exerted on the window pane is minimal such that the fragment 19 does not become loose and the window pane does not collapse or cave in. Depending on the location and accessibility of the window structure 12, the unifying material 20 can be sprayed from a hand-held spraying device 22 or from a remotely controlled spraying device mounted on an extendable pole or handle.

Figure 2:
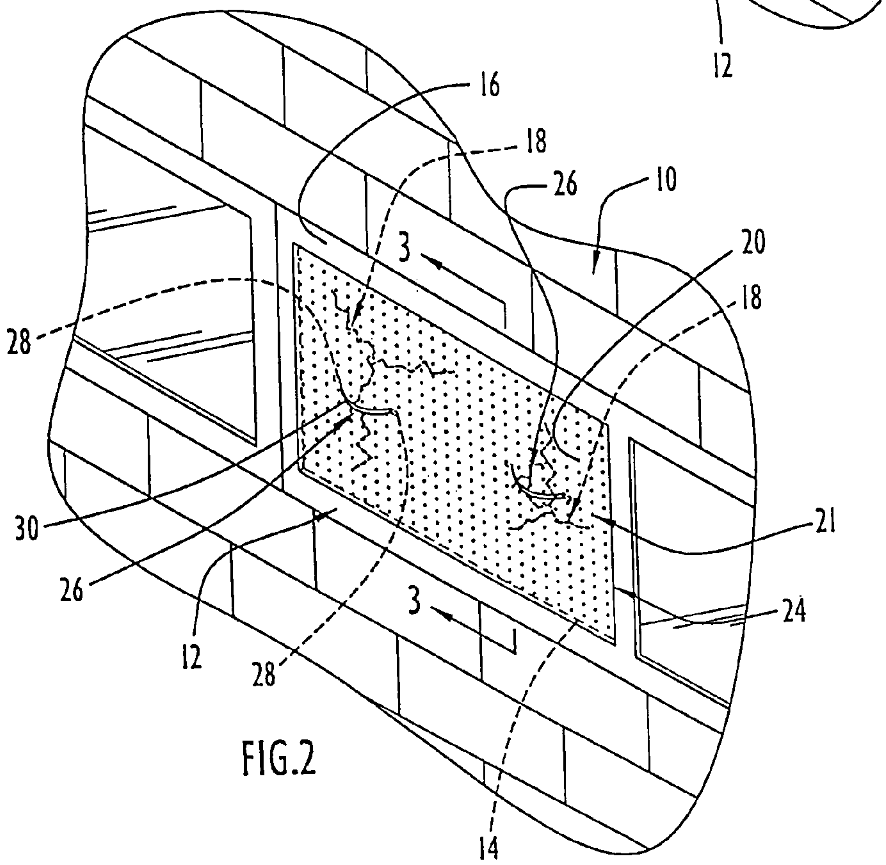
FIG. 2 is a broken, front perspective view of the building of FIG. 1 subsequent to application of the layer of unifying material to the shattered pane to form the shattered pane into a cohesive mass.
Figure 3:
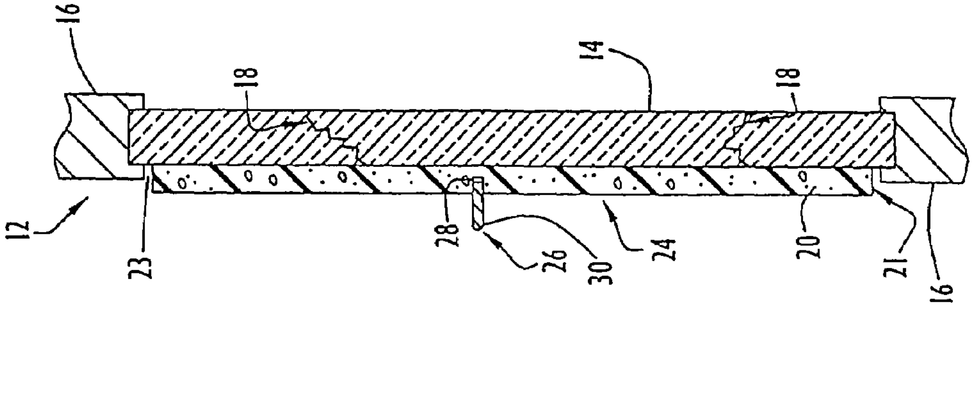
FIG. 3 is a broken cross-sectional view of the window structure taken along line 3—3 of FIG. 2.

The unifying material 20 is applied to the window pane 14 in a layer 21 in the procedure illustrated in FIGS. 2 and 3. Preferably, the layer 21 of unifying material 20 is applied to the entire or substantially the entire surface area of the window pane exterior surface and/or interior surface exposed by frame 16 and selected to receive the layer of unifying material. However, depending on the damage to the window pane, the layer of unifying material may be applied to only a cracked, broken or shattered section or sections of the window pane and may thusly be applied to only a selected portion or portions of the window pane exterior surface and/or interior surface corresponding to the cracked, broken or shattered section or sections. The layer 21 of unifying material may be applied to a desired thickness sufficient to structurally unite the shattered pane into a cohesive mass as explained further below. Typical thicknesses may be in the range of ⅛ inch to one inch thick or more, with layers of greater thickness typically being used on window panes of relatively greater thickness, weight and/or external size. In illustrative procedures, a layer of polymeric foam unifying material 1 to 2 inches thick was found sufficient for a shattered glass pane ⅜ inch thick, and a foam layer about ¾ inch thick worked well on a shattered window pane 3/16 inch thick. The thickness of layer 21 may be uniform or non-uniform. Depending on the width of cracks 18, the fluidic unifying material may seep into or enter one or more of the cracks 18, and the unifying material may seep into one or more cracks the entire or less than the entire depth of the one or more cracks. Accordingly, the fluidic unifying material may seep into one or more cracks 18 so that fragments or shards, such as fragment 19, of pane 14 are embedded in the unifying material.

FIGS. 2 and 3 are representative of a stabilized window structure and FIGS. 1–3 are representative of a stabilizing procedure wherein the layer 21 of unifying material 20 is applied to substantially the entire surface area of the exterior surface of window pane 14 exposed by frame 16. FIGS. 2 and 3 show the layer 21 of unifying material 20 applied to window pane 14 inside of frame 16 without any overlap of the layer 21 of unifying material on the frame 16. In order to ensure that no unifying material is applied over frame 16, a small peripheral gap or border 23 may be maintained during the application process between the frame 16 and the perimeter of the layer 21 as shown in FIG. 3. Avoiding overlap of the frame 16 by the layer 21 of unifying material 20 ensures that the layer of unifying material does not bond or adhere to the frame, thereby facilitating removal of the window pane 14 from the frame 16 as described further below. It should be appreciated that the layer 21 of unifying material 20 may overlap the frame 16 and, if needed, a suitable release element can be disposed over frame 16 between the frame and the unifying material to prevent or inhibit the unifying material 20 from bonding or adhering to the frame 16. The release element may include a chemical agent or composition and/or a physical or mechanical barrier. Suitable release elements are disclosed in applicant's prior U.S. patent application Ser. No. 09/362,890 filed Jul. 29, 1999, and now U.S. Pat. No. 6,289,642 B1, Ser. No. 09/878,214 filed Jun. 12, 2001, Ser. No. 09/880,774 filed Jun. 15, 2001 and Ser. No. 09/920,750 filed Aug. 3, 2201, the entire disclosures of which are incorporated herein by reference. Suitable release elements include, but are not limited to, silicone, hydrocarbons of relevant molecular weight, petroleum based release agents, alcohols, aliphatic hydrocarbons, aromatic hydrocarbons, halogenated solvents, glycol ethers, methyl ethyl ketones, xylene, d-limonene, phthalates, benzoates, releasable tape, polyurethane, and polyethylene film. Of course, it may be desirable that the release element not be disposed over a significant portion of the glass pane 14 so that the surface area of pane 14 that is bonded to the unifying material may be maximized.

It is preferred that the layer 21 cover each crack 18 in its entirety or substantially in its entirety. FIG. 2 illustrates the cracks 18 in their entireties covered by layer 21. In some cases, however, such as where a crack meets frame 16, it may not be feasible for the layer 21 to cover the crack in its entirety, such as due to the need to maintain a peripheral gap between the frame and the perimeter of the layer. Accordingly, the layer 21 should cover a substantial portion of the one or more cracks 18 and, preferably, should cover as much as possible of cracks 18. However, it should be appreciated that crack coverage may vary depending on the particular application presented during use.

Figure 4:
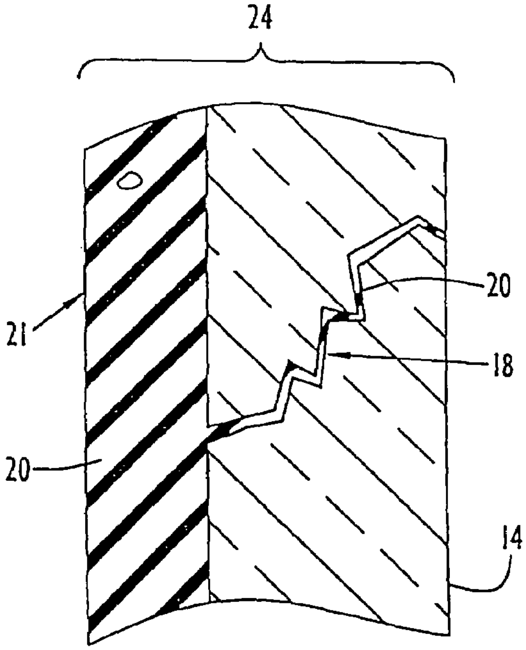
FIG. 4 is an enlarged, fragmentary cross-sectional view of the cohesive mass illustrating seepage of the unifying material into a crack of the shattered pane.

Subsequent to being applied to the window pane 14, the layer 21 of polymeric unifying material 20 reacts, cures, dries, sets, hardens, rigidifies or solidifies quickly to form the shattered pane 14 into a cohesive, unified or integral mass 24 as shown in FIGS. 2 and 3. It should be appreciated that the use of any one term, or its derivative, from the set of terms including "reacts", "cures", "dries", "sets", "hardens", "rigidifies" and "solidifies" and the like encompasses the entire set of terms and its derivatives. The layer 21 of polymeric unifying material 20, when cured, is a solidified compressible material to which the window pane 14 including any individual fragments, such as fragment 19 and even the tiniest of fragments, are bonded or adhered. Although the layer 21 of unifying material 20 is shown as being flat or smooth along its outer, exposed surface and as being of uniform thickness, the layer of unifying material may be non-flat or non-smooth and may be of non-uniform thickness. Typically, the outer surface of polymeric unifying material 20 will be covered with small bumps after curing. Where the unifying material 20 has entered a crack 18 as shown in FIG. 4, a structural or mechanical bond is created at the crack when the unifying material solidifies. In FIG. 4, the crack 18 extends through the entire thickness of window pane 14, and the unifying material 20 extends into the crack 18 from the exterior surface to the interior surface of window pane 14. FIG. 4 is thusly illustrative of the unifying material 20 extending the entire depth of the crack as well as the entire thickness of pane 14. However, the crack depth and pane thickness to which the unifying material extends may vary in accordance with the crack width, the crack depth, the viscosity of the fluidic unifying material and/or other factors. The unifying material 20 is desirably very adhesive to ensure a strong bond with the window pane 14 so that the layer 21 of polymeric unifying material 20 is permanently or substantially permanently bonded, adhered or attached to the window pane. Accordingly, the window pane does not become detached from the layer of polymeric material when extraneous forces are applied to the cohesive mass during removal from frame 16, during disposal and/or while the cohesive mass is allowed to remain in place in frame 16 prior to removal. The strong bond between the layer of unifying material and the window pane also allows the cohesive mass to be removed from frame 16 by pulling as explained further below, although the cohesive mass can be removed by pulling and/or pushing as also explained further below.

The polymeric unifying material 20 may include a polyurethane or a polyethylene with a propellant causing the polyurethane or polyethylene to foam upon application to the window pane so that the polymeric material remains in place as it is applied. FIG. 3 illustrates the polymeric unifying material 20 as a polymeric foam material. Polymeric foams are generally very adhesive by nature and thus ensure adequate bonding to the window pane so that no fragments separate from the cohesive mass 24 during its removal. It should be appreciated, however, that the unifying material may be a non-foaming polymeric material, such as a non-foam polymeric film, as described further below. It should be further appreciated that the layer 21 can be pre-formed and then subsequently bonded or adhered to the window pane with a suitable adhesive or bonding agent, and the unifying material 20 may be used as the adhesive or bonding agent. Various polymeric foams can be used in the present invention including those disclosed in applicant's prior patent applications previously incorporated herein by reference. Examples of polymeric foam materials that may be utilized in the present invention include polyethylene, such as Ethafoam of Dow Chemical Company, polystyrene, polyurethane and copolymers of the foregoing.

Use of a polymeric foam for the unifying material results in a spongy, three-dimensional, compressible, elastomeric web pattern with open or closed cells or pores, sometimes containing entrapped gas for energy absorption. Accordingly, the layer 21 of polymeric unifying material 20 can absorb energy from impacts sustained prior to, during, and subsequent to removal of the cohesive mass 24. In addition, the layer 21 of polymeric material 20 is deformable so as to allow the cohesive mass 24 to resiliently bend, flex, cave in or buckle along the relatively weaker areas defined by the one or more cracks 18, thereby facilitating removal of the cohesive mass from the window frame. The present invention is not limited to polymeric materials in that various non-polymeric materials capable of unifying a shattered window pane into a cohesive mass may be utilized as the unifying material.

In accordance with the present invention, one or more grasping members may be attached to the cohesive mass 24 for use in grasping the cohesive mass to facilitate removal thereof, although the cohesive mass can be removed without the use of grasping members. FIG. 2 illustrates a pair of grasping members 26 attached to the cohesive mass 24 by the polymeric unifying material 20, which acts as a bonding agent or adhesive for the grasping members. The grasping members 26 are formed as handles, respectively, each having opposing ends 28 embedded in the layer 21 of polymeric unifying material 20 and an elongate grasping portion 30 extending between ends 28 as shown in FIGS. 2 and 3. The ends 28 may be embedded or pushed into the layer 21 of polymeric unifying material 20 before it fully cures, with the grasping portion 30 maintained externally and free of the layer of polymeric unifying material. If necessary, such as where the thickness of the layer 21 is insufficient to firmly secure the ends 28, additional polymeric unifying material 20 may be added at the attachment sites for ends 28 to increase the thickness and, therefore, the securing strength, of the polymeric material at the attachment sites. When the polymeric material 20 has finally cured, the ends 28 will be bonded or adhered to the polymeric material, and the grasping members 26 will be attached to the cohesive mass 24.

The handles can be made of any suitable material including plastic, metal, cardboard, paper, string and wood. Where additional unifying material is applied to the layer 21 for securement of the grasping members, the additional unifying material can be applied before and/or after the layer 21 has finally cured. Also, the layer 21 and the additionally applied unifying material can be used individually or in combination to secure the grasping members to the cohesive mass in that the handle ends can be embedded or inserted in the layer 21 and/or in the additionally applied unifying material. The grasping members 26 formed as handles can be cut or fabricated to have a desired length such that the length of the handles is adjustable. The length of the handles may also be adjusted by controlling the length of ends 28 that is embedded in the unifying material. By allowing the grasping members 26 to be attached in situ, the optimal locations for the grasping members can be selected in accordance with variables such as location of the window structure, accessibility of the window structure, and size, configuration and/or weight of the window pane. Where the layer of polymeric unifying material is pre-formed and not formed in situ, grasping members can be attached thereto in situ or during the layer formation process. The grasping members can be secured to the cohesive mass in various ways including the use of other adhesives or bonding agents and/or mechanical securing elements such as clips and the like. The ends of the grasping members may be flat or can have any desired shape, and may be secured directly to the window pane via adhesives and/or mechanical securing elements as explained further below. In the latter case, the grasping members may be attached to the window pane surface selected to receive the unifying material and/or to a surface of the window pane devoid of unifying material as explained in further detail below.

The polymeric unifying material 20 may be supplied as a one-component supply system, as shown by FIG. 1, or as a two-component supply system, as explained further below. In the one-component supply system of FIG. 1, mixing takes place in a tank or container 34 of spraying device 22, which has a discharge device or nozzle 36 for spraying or discharging the fluidic polymeric material from the container 34. As an example of a one-component supply system, container 34 contains a polymeric blend such as a polymeric polyol, polyurethane prepolymer and a polymeric hydrocarbon propellant to be discharged as a foam from delivery device 36.

The nozzle 36 may be designed to emit the polymeric unifying material in a broad or narrow discharge pattern depending on the coverage needed for a particular application. Where the polymeric unifying material is to cover a relatively large surface area, as shown in FIG. 1, it is preferred that the nozzle be designed, for example, as a wide fan spay nozzle, to provide a broad discharge pattern to reduce the time required to cover a large surface area. Where the polymeric unifying material is to be applied to a relatively narrow or constricted surface area, such as to window pane fragments along a track of a window frame as explained below, it is preferred that the nozzle be designed, for example, as a narrow band nozzle, to provide greater control and targeting of the polymeric unifying material. The supply system for the polymeric material can be provided with a nozzle having a discharge pattern adapted for a particular application, and different supply systems having nozzles with different discharge patterns for different applications can be made available to users. Alternatively, the supply system can be provided with a multi-functional nozzle capable of selectively generating different discharge patterns so that a single supply system can be used for different applications. As a further alternative, a plurality of nozzles having different discharge patterns can be provided with or made available for interchangeable use with the supply system.

It should be appreciated that the layer or body of unifying material 20 can be applied in any desired shape or formation depending on the particular application. Accordingly, the terms "layer" and "body" are used interchangeably to encompass any desired deposition or formation of material including broad and narrow depositions made up of a single layer, thickness or coat of uniform or non-uniform thickness or of multiple sub-layers, sub-thicknesses or sub-coats of uniform or non-uniform thicknesses applied sequentially one on top of the other as described further below.

Once the polymeric unifying material 20 applied to window pane 14 has cured sufficiently, which may occur within a few minutes after application, the window structure 12 may be considered stabilized in that formation of the shattered pane 14 into cohesive mass 24 restores structural integrity and sealing functionality to the window pane. The window pane 14 will then be in condition for safe removal as part of the cohesive mass, which may be removed as one piece or as a plurality of relatively large pieces. However, since the window structure 12 is stabilized, the window pane 14 does not have to be removed immediately but can remain in place until a suitable replacement pane and/or convenient time for replacement is/are available. The polymeric unifying material 20 is water-repellant and resistant to degradation or damage from environmental elements and can remain exposed to weather conditions such as rain, snow, sun and wind. While the window pane 14 remains in place, the window pane as well as people and objects disposed to the exterior and/or the interior sides of the window structure are protected from injury and damage. In particular, collapsing or caving in of the window pane is inhibited, glass fragments and shards such as fragment 19 are bonded or embedded in the polymeric unifying material and cannot become loose, and the passage of environmental elements through the glass pane is deterred due to the barrier or seal provided by the cohesive mass. It should be understood that the terms "barrier" and "seal", and their derivatives, are used interchangeably and that "seal" and its derivatives encompass complete and partial seals.

Figure 5:
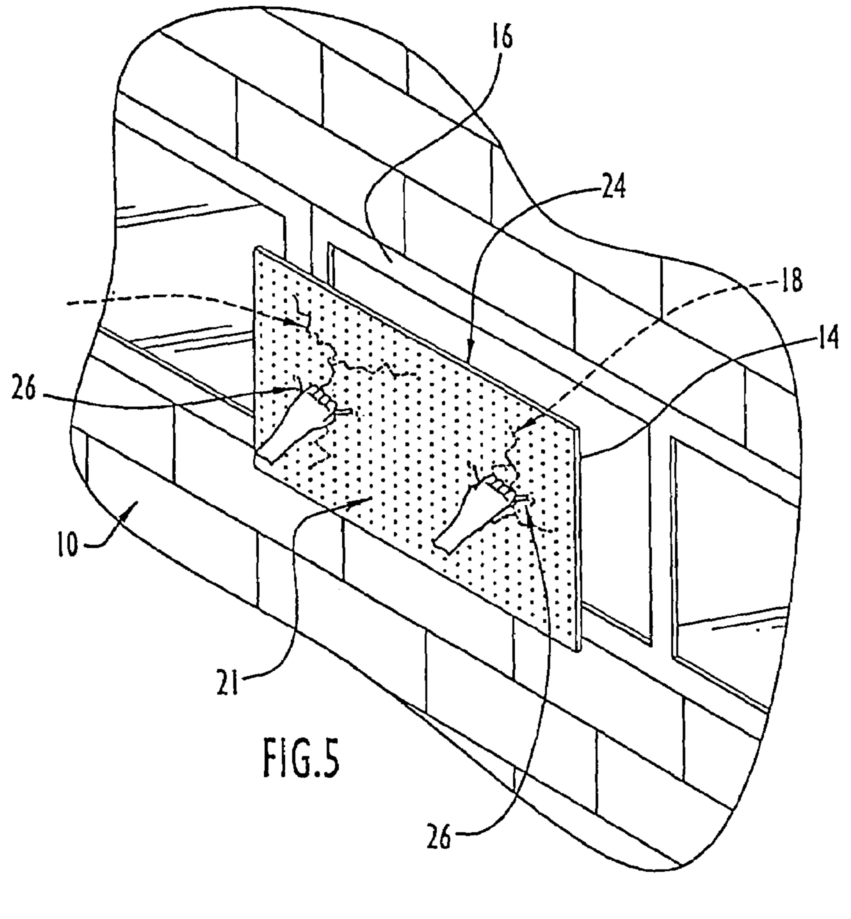
FIG. 5 is a broken, front perspective view of the building of FIG. 2 illustrating removal of the shattered pane with the cohesive mass.

The window pane 14 may be safely removed to the exterior of building 10 by pulling the cohesive mass 24 in the exterior direction from the frame 16 as shown in FIG. 5, wherein the cohesive mass is manually pulled via hands holding grasping members 26. As the cohesive mass 24 is pulled, it may resiliently flex, bend, deform or cave in, as needed, along the relatively weakened areas of the cohesive mass presented at cracks 18 to permit disengagement of the window pane 14 from frame 16. If necessary, the cohesive mass 24 may be hit adjacent to frame 16 with a hammer or other tool, a tool may be inserted between the window pane 14 and the frame 16 and/or a glass punch or cutting tool may be used to separate, disengage and/or cut the window pane 14 from the frame 16 and/or the fabrication or construction and, typically, from the track of the window structure. Various tools or implements employed in various ways can be used for the latter purposes. As shown in FIG. 5, the cohesive mass 24, including the layer 21 of unifying material 20 and the window pane 14 bonded thereto, may be removed as a single, integral and unitary piece. However, the cohesive mass 24 may be selectively removed as a plurality of relatively large, integral and unitary pieces of cohesive mass 24, with each piece including a section of the layer 21 and a corresponding section of window pane 14 attached thereto. In either case, the window pane remains attached to the layer of unifying material during and subsequent to removal such that glass fragments or shards do not become separated or detached. Where it is desired to remove the window pane as more than one piece of cohesive mass 24, such as where the window pane is too large and/or too heavy to remove as a single piece, the cohesive mass may be cut into a plurality of pieces prior to removal. The cohesive mass 24 may be cut into a plurality of pieces by cutting through the layer 21 and through pane 14 to obtain a plurality of separately removable pieces of cohesive mass 24 and each piece of the cohesive mass may be associated with one or more grasping member. To avoid the need for cutting through the window pane, pre-existing cracks or fissures of the window pane can be used to delineate the pieces of the cohesive mass so that the layer of unifying material need only be cut through along the one or more pre-existing cracks or fissures. Depending on the pattern or arrangement of pre-existing cracks in window pane 14, the cracks themselves may be used to define the formation of separately removable cohesive masses as described in detail below. When the cohesive mass 24 is removed from frame 16 as shown in FIG. 5, the cohesive mass may remain as a single, integral unit during transport to a disposal site. Similarly, where the cohesive mass is removed as more than one piece, each piece may remain intact as a single, integral unit.

Although the cohesive mass 24 is shown herein as being removed to the exterior side of the window structure by a single, exteriorly located person pulling the cohesive mass in the exterior direction, it should be appreciated that the cohesive mass can be removed to the exterior side or to the interior side of the window structure as one or more pieces by one or more persons in various ways, such as by pulling and/or pushing the cohesive mass, with or without the use of grasping members. Pulling and/or pushing of the cohesive mass can be performed using the hands or various conventional tools. Where no grasping members are provided, the cohesive mass can merely be pushed to the interior side or to the exterior side of the window structure. Subsequent to being removed from the window frame 12 and the fabrication or construction, i.e. building 10, the cohesive mass 24 including window pane 14 thereof can be safely handled and transported to a disposal site.

Figure 6:
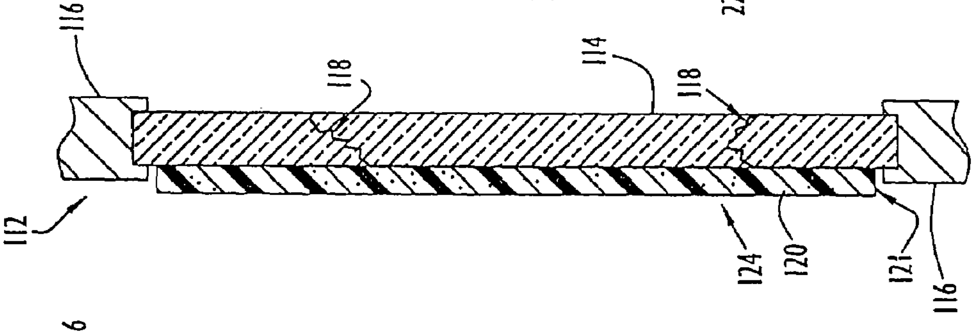
FIG. 6 is a broken cross-sectional view of a window structure illustrating an alternative layer of unifying material applied to a shattered pane of the window structure.

FIG. 6 illustrates a stabilized window structure 112, similar to window structure 12, including a layer 121 of non-foam unifying material 120 applied to the exterior surface of a broken window pane 114. The window pane 114 is mounted in frame 116 and has cracks 118 therein. The layer 121 of unifying material 120 may be applied, such as by spraying, to window pane 114 in fluidic form as described above and, upon drying, curing, hardening or setting of the unifying material 120, a cohesive mass 124 is formed including the layer 121 of unifying material 120 and the window pane 114 adhered thereto. Illustrative non-foam unifying materials, which may be polymers or non-polymers, suitable for use in the present invention include cellulosic and polymer films such as polyvinyl, latex, polyurethane, acrylate such as acrylic latex, cellophane and other polymers, and cellulosics or composites. Another representative foam material is Acrylic Latex sold by Dow Chemical Company.

Figure 7:
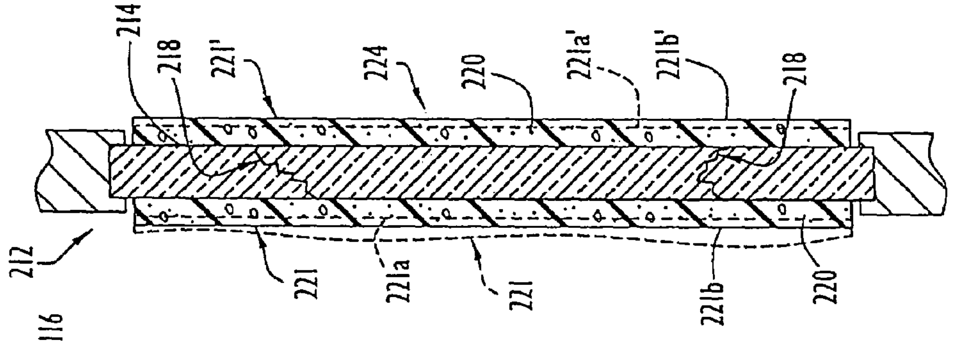
FIG. 7 is a broken cross-sectional view of a window structure showing layers of unifying material applied to the exterior and interior surfaces, respectively, of a shattered pane of the window structure, with one of the layers including a plurality of sub-layers.

A stabilized window structure 212 in which first and second layers 221 and 221' of unifying material 220 have been applied to both the exterior and interior surfaces, respectively, of window pane 214 having cracks 218 therein is shown in FIG. 7. Unifying material 220 is similar to unifying material 20, and each layer 221 and 221' is made up of multiple sub-layers or coats of unifying material 220 as shown by first and second sub-layers 221*a* and 221*b* for layer 221 and sub-layers 221*a'* and 221*b'* for layer 221'. The sub-layers for each layer 221 and 221' may be applied sequentially, one on top of the other, after at least partial curing of the underlying sub-layer. Applying layers 221 and 221' of unifying material to both the exterior and interior surfaces of window pane 214 enhances the seal and structural integrity provided by the cohesive mass 224, which includes window pane 214 and layers 221 and 221' adhered thereto. More particularly, the shattered window pane 214 is sealed, confined or encapsulated between the layers 221 and 221', and the layers 221 and 221' provide additional assurance that glass fragments will not become detached from the cohesive mass 224. Although the layers 221 and 221' are illustrated as being similar to layer 21, it should be appreciated that multiple sub-layers of unifying material similar to layer 121 can be applied to the exterior and/or interior surfaces, respectively, of a shattered window pane. As shown by dotted lines for layer 221, the layers of unifying material may be of non-uniform or varying thickness.

Figure 8:
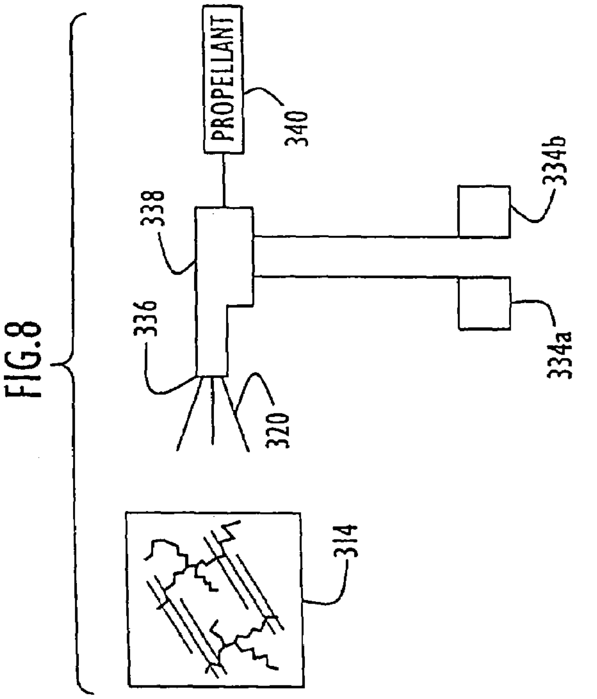
FIG. 8 is a schematic view illustrating use of a two-component supply system in the present invention.

A two-component supply system for use in the present invention is illustrated in FIG. 8. The two-component supply system includes a first supply tank or container 334*a* containing component A, such as a polymeric polyol, a second supply tank or container 334*b* containing component B, such as disocyanate, and a mixing head 338 which statically blends and reacts components A and B under pressure from a propellant 340 for delivery of polymeric unifying material 320 in fluidic form through discharge device or nozzle 336. The disocyanate and the polymeric polymer are mixed under the propellant's pressure and sprayed onto a shattered window pane 314. Foaming will start as soon as the polymeric blend is deposited on the window pane 314, and a desired polymeric foam thickness may be achieved. As noted above, additional sub-layers or coats can be applied for extra protection. A catalyst can be added to the supply system if it is desired to decrease curing time. The one-component supply system of FIG. 1 is similar with the exception that a higher viscosity polyurethane prepolymer is used that is moisture cured by atmospheric humidity. Examples of suitable two-component supply systems are the Froth-Pak® system of Flexible Products Company of Marietta, Ga. and Handi-Foam® of Fomo Products, Inc.

Figure 9:
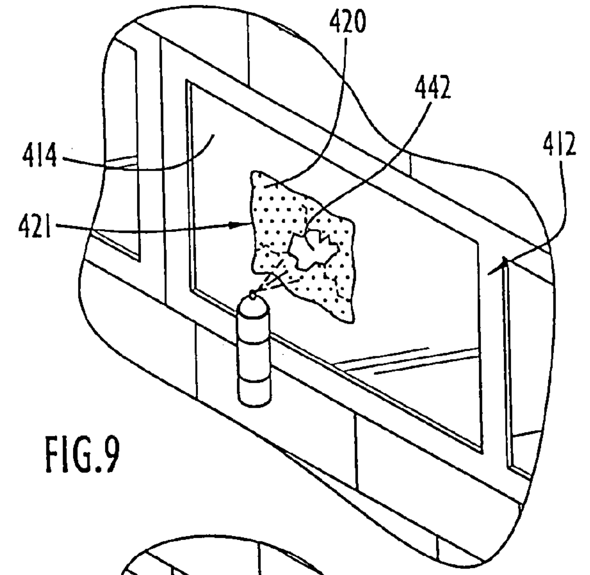
FIG. 9 is a broken, front perspective view of a building including a window structure having a shattered pane with a hole therein and showing a first layer of unifying material being applied to the pane around the hole.
Figure 10:
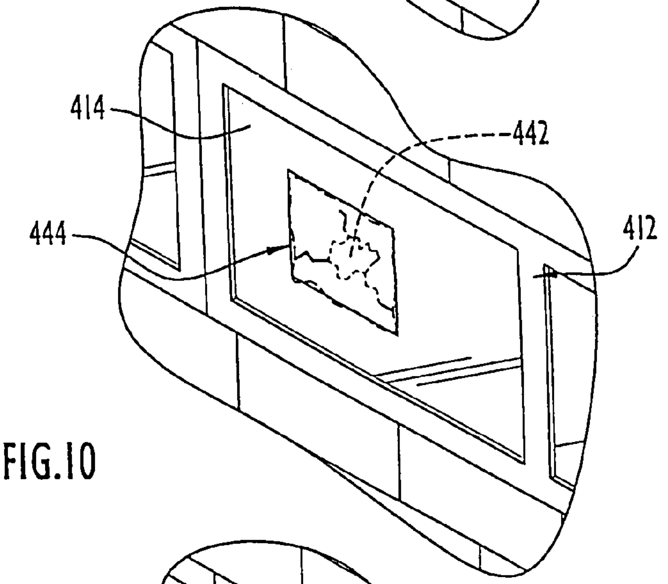
FIG. 10 is a broken, front perspective view of the building of FIG. 9 showing a patch applied over the hole and being adhered by the first layer of unifying material.
Figure 11:
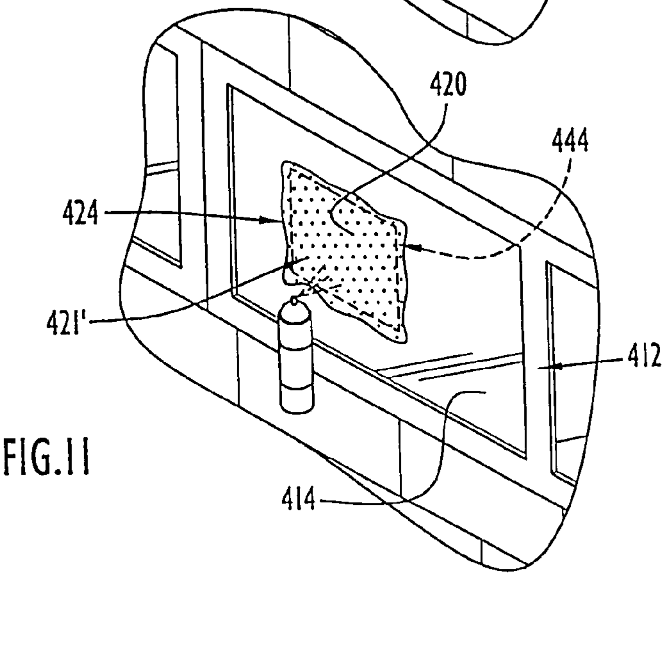
FIG. 11 is a broken, front perspective view of the building of FIG. 10 illustrating a second layer of unifying material being applied over the patch to seal the hole in the pane.

FIGS. 9–11 illustrate a procedure for stabilizing a window structure 412 having a shattered window pane 414 that is missing one or more fragments. As a result of the one or more missing fragments, window pane 414 has a hole, opening or void 442 therein. In accordance with the present invention, a first layer 421 of unifying material 420 is applied to the exterior or interior surface of window pane 414 around the perimeter of hole 442 as shown in FIG. 9, which illustrates the first layer 421 of unifying material 420 being sprayed onto the exterior surface of window pane 414. The unifying material can be a foam or non-foam polymer, a cellulosic material or any other suitable unifying material. A patch 444, larger than the hole 442, is positioned over the hole 442 and is adhered to the unifying material as shown in FIG. 10. The patch 444 will bond to the unifying material around the perimeter of hole 442 and thusly close off the hole 442. Once the layer 421 of unifying material 420 has cured sufficiently so that the patch 444 is bonded, adhered or secured to the window pane 414, a second or additional layer of unifying material 421' is applied over the patch, as shown in FIG. 11, to provide structural integrity and a seal for the hole 442. The second layer 421' bonds to the first layer 421, to the patch 444 and to the window pane 414 to form a cohesive mass. Preferably, the second layer 421' of unifying material is applied to an area larger than the patch 444 so that the edges of the patch are covered and thereby sealed. The seal provided by the additional layer 421' of unifying material deters the entry of water and other environmental elements through the hole 442. The patch 444 may be cut to size during use and may be made of any suitable material including, but not limited to, cotton and synthetic fabrics, plastics, paper, rubber, metal, wood, cellulose and foam. Of course, one or more layers of unifying material, with or without a patch, may also be applied to the interior surface of the window pane 414 for additional protection. Also, the patch 444 does not have to be secured to the window pane using the unifying material, since the patch can be self-securing or may be secured using other adhesives. An example of a self-securing patch is one having an adhesive backing. It should also be appreciated that, depending on the size of the hole, the patch may include a single patch member covering the hole in its entirety, or may include a plurality of patch members arranged to cover the entirety of the hole.

Figure 12:
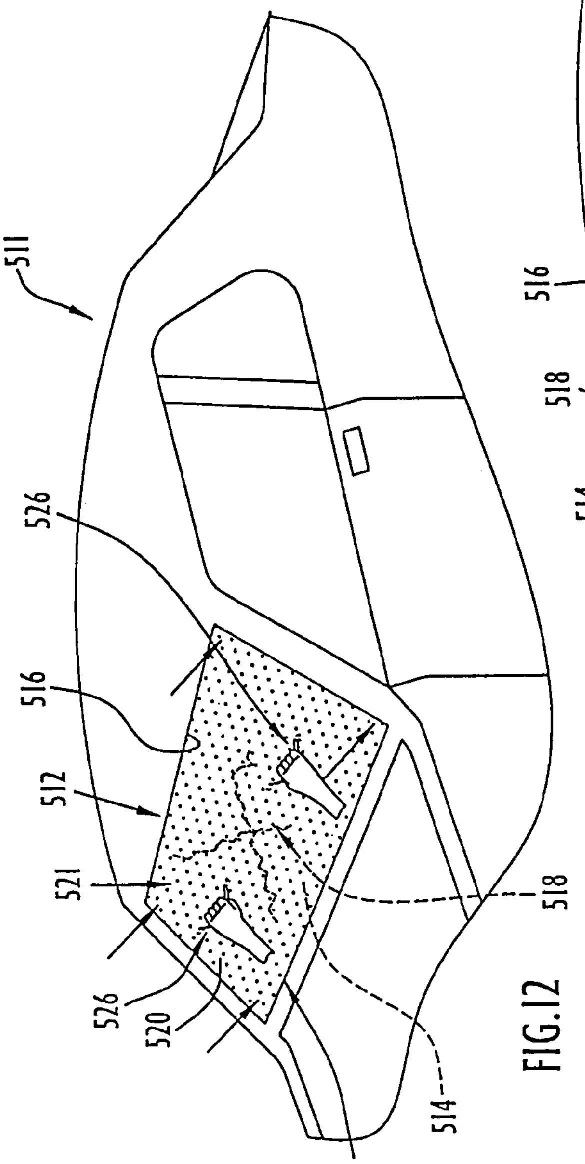
FIG. 12 is a broken, front perspective view of an automobile having a shattered windshield to which a layer of unifying material has been applied to form a cohesive mass and illustrating the shattered windshield being manually held via handles attached to the cohesive mass.

An automobile 511 having a window structure 512 stabilized in accordance with the present invention is illustrated in FIG. 12. Window structure 512 includes a frame 516 and a shattered windshield 514 of non-planar configuration mounted in frame 516; however, the present invention is applicable to various fixed and slidable or other movable windows in vehicles. The present invention is useful for stabilizing and removing shattered vehicle windows in emergency and non-emergency situations, but is particularly useful in emergency situations where a vehicle window must be quickly removed to access one or more passengers in the interior of the vehicle without pushing glass fragments into the interior and causing injury to the one or more passengers. As shown in FIG. 12, a layer 521 of unifying material 520 is applied to the exterior surface of windshield 514 over cracks 518 and forms cohesive mass 524 including the shattered windshield 514 and the layer 521 adhered or bonded thereto. In FIG. 12, the layer 521 of unifying material 520 is shown applied to the entire exterior surface of windshield 514 exposed by frame 516, with the layer 521 conforming to the curvature of the windshield 514. Also, grasping members 526 in the form of handles have been secured to cohesive mass 524. Where access to the interior of the vehicle is possible, such as in non-emergency situations, a layer 521 of polymeric material 520 can be applied to the interior surface and/or to the exterior surface of windshield 514. With a layer 521 applied to either or both of the exterior surface and interior surface of windshield 514, the window structure 512 is stabilized due to the barrier provided by the cohesive mass and the structural integrity that is restored to the windshield. In non-emergency situations, the damaged windshield can safely remain in place prior to and while awaiting installation of a replacement windshield, and the vehicle interior will be protected from environmental elements. Of course, it should be appreciated that holes present in the window panes of vehicles can be patched as described above for window structure 412.

Figure 13:
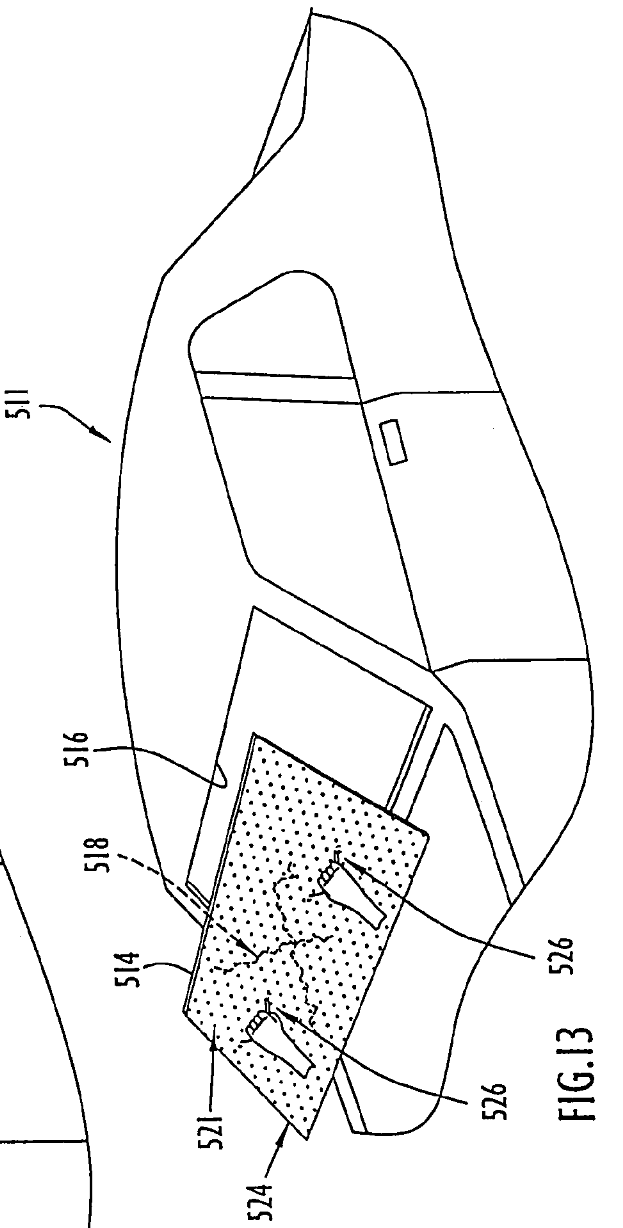
FIG. 13 is a broken, front perspective view of the automobile of FIG. 12 illustrating removal of the shattered windshield with the cohesive mass.

To remove shattered windshield 514, the grasping members 526 are grasped from the exterior side of automobile 511, and the cohesive mass 524 is pulled in the exterior direction as shown in FIG. 13. The cracks 518 in windshield 514 permit the cohesive mass 524 to resiliently deform, buckle, cave in, bend or flex along the relatively weaker areas defined by cracks 518 so that the windshield 514 is disengaged from the frame 516. If the windshield 514 is not cracked or shattered sufficiently to permit the cohesive mass 524 to deform to the extent necessary to disengage the windshield from frame 516, the windshield can be held substantially in place by one or more persons via grasping members 526 while a force is applied to the edges of the windshield in the interior direction, as shown by arrows in FIG. 12. The force applied to the edges of the windshield 514 may be applied using a window punch or another suitable tool, and an interiorly directed force may be applied to the edges of the windshield at various locations adjacent to the frame 516 as shown by the arrows of FIG. 12. In this way, the edge of windshield 514 may be disengaged from the frame 516, but the windshield is prevented from falling into the automobile interior by the exteriorly directed counter force applied via grasping members 526. The edges of the windshield can be disengaged in various ways using various tools or implements, including those for cutting.

Figure 14:
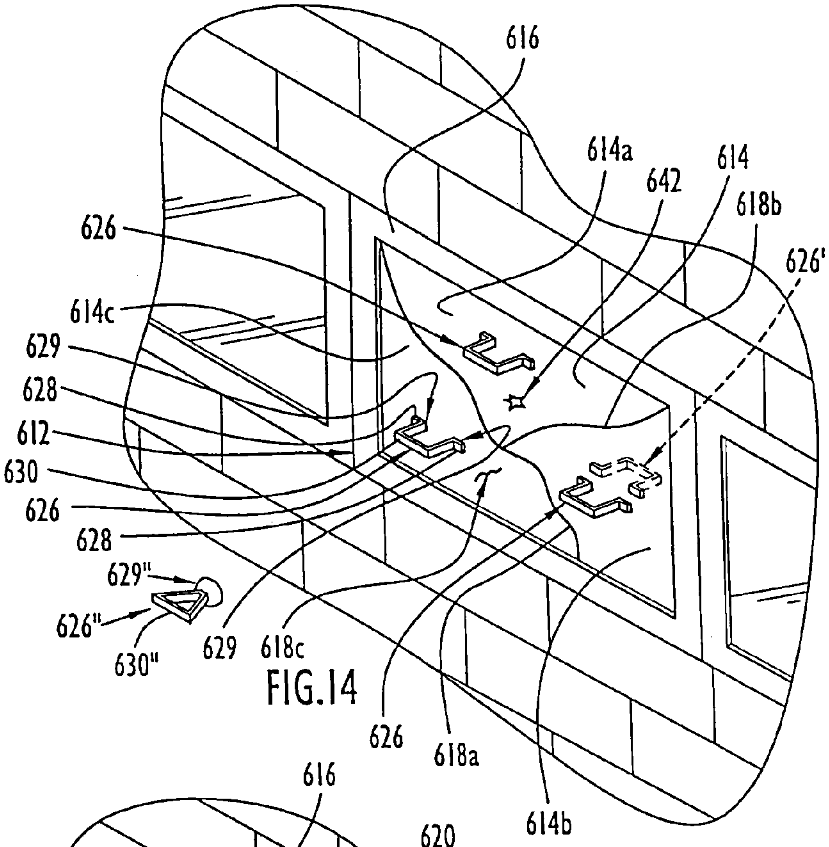
FIG. 14 is a broken, front perspective view of a building including a window structure having a window pane with pre-existing cracks dividing the window pane into a plurality of separate, disconnected window pane sections and showing grasping members attached directly to the window pane.

FIG. 14 illustrates a window structure 612 having two intersecting cracks 618*a* and 618*b* dividing window pane 614 into three separate and disconnected window pane sections 614*a*, 614*b* and 614*c*. One or more of the window pane sections 614*a*, 614*b* and 614*c* may have cracks, holes or fissures therein, and such cracks, holes or fissures may divide the one or more window pane sections into separate and disconnected fragments. FIG. 14 illustrates window pane section 614*a* with a hole 642 therein of a size suitable to be patched, plugged or filled by the unifying material itself without the need for a separate patch and illustrates window pane section 614*c* with a crack 618*c* that may or may not divide window pane section 614*c* into separate and discontinuous fragments. FIG. 14 also illustrates grasping members 626 secured directly to the window pane 614. Grasping members 626 each have flat ends 628 provided with securing elements 629 for securement to window pane 614 for each window pane section, respectively, and grasping portion 630 extending between ends 628. The securing elements 629 for grasping members 626 include layers of adhesive on the flattened ends 628, respectively. The grasping members 626 are shown in FIG. 14 secured to the surface of window pane 614 selected to receive the unifying material, the grasping members being secured to the exterior surface of window pane 614 in the illustrated embodiment. Where the grasping members are secured to the surface of the window pane selected to receive the unifying material, the grasping members will typically be secured to the window pane prior to application of the unifying material to the selected surface. However, the grasping members could be secured to the window pane during or after application of the unifying material thereto by inserting the ends through the unifying material to contact the window pane, as would typically be done before the unifying material fully cures. Depending on the design of the securing elements, the grasping members may be secured directly to the unifying material after it has fully cured. The grasping members 626 can be secured to the window pane sections 614*a*, 614*b* and 614*c*, respectively, at any suitable locations selected by the glass remover. Grasping members 626 may alternatively or additionally be secured to the surface of window pane 614 opposite the surface selected to receive the unifying material. To illustrate this, a grasping member 626' is shown in dotted lines with its flat ends adhesively secured to the interior surface of window pane 614 for window pane section 614*b*. The grasping member 626' is shown secured to the interior surface of window pane section 614*b* prior to application of the unifying material to the exterior surface, but can be secured to the interior surface of the window pane at any time before, during or after application of the unifying material, since the interior surface has not been selected to receive the unifying material. Of course, where the interior surface of the window pane is alternatively or additionally selected to receive the unifying material, the selected number of grasping members 626' may be secured to the interior surface of the window pane prior to, during or after application of the unifying material thereto as described above for grasping members 626. Another grasping member 626" is illustrated in FIG. 14 and includes a triangular shaped grasping portion 630" attached to a securing element 629". The securing element 629" for grasping member 626" includes a suction cup for direct attachment of the grasping member 626" to the window pane before, during or after application of the unifying material to the window pane.

Figure 15:
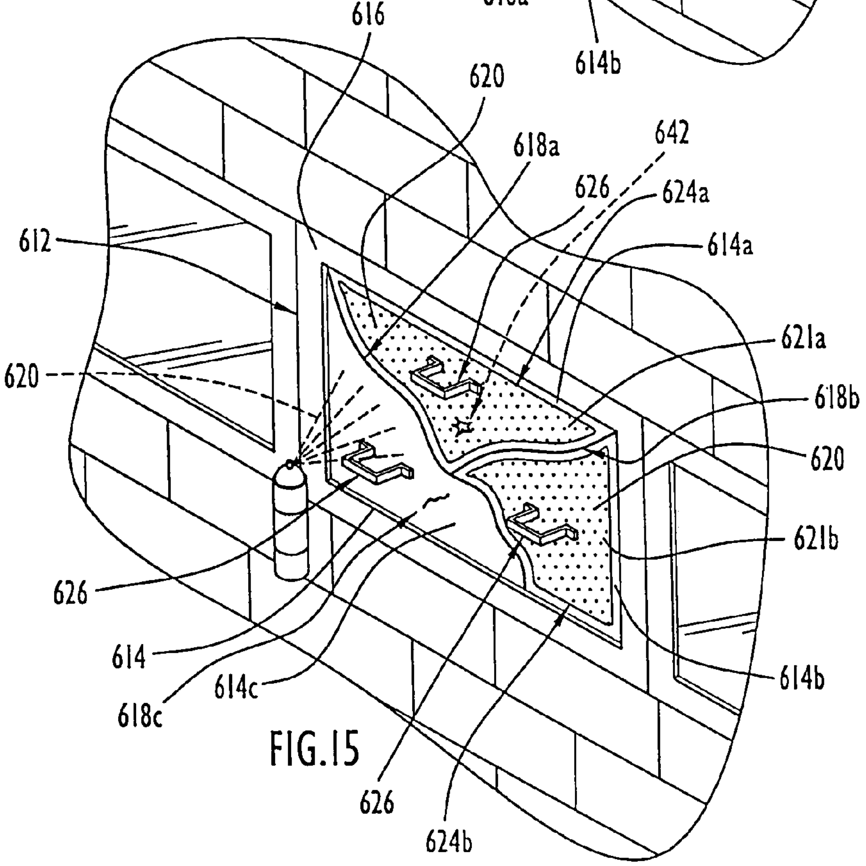
FIG. 15 is a broken, front perspective view of the building of FIG. 14 illustrating application of layers of unifying material to the window pane sections, respectively, to form a plurality of separate, discontinuous cohesive masses, respectively.
Figure 16:
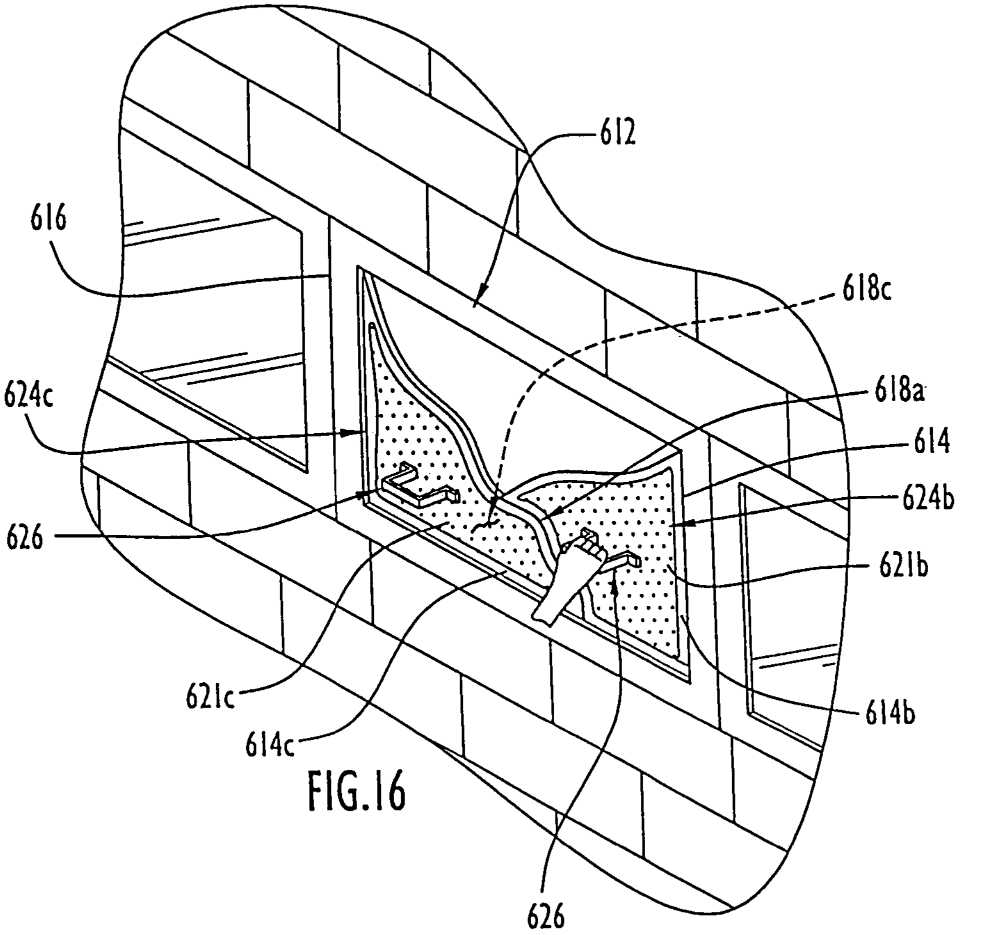
FIG. 16 is a broken, front perspective view of the building of FIG. 15 depicting removal of the cohesive masses separately from one another.

A method of removing shattered window pane 614 is illustrated in FIGS. 15 and 16, and is representative of a method in which pre-existing cracks in a damaged window pane are used to define, delineate, or demarcate the formation of a plurality of separately removable cohesive masses. FIG. 15 shows layers 621*a* and 621*b* of unifying material 620 already applied to the exterior surface of window pane sections 614*a* and 614*b*, respectively, and a layer of unifying material 620 being applied to the exterior surface of window pane section 614*c*. FIG. 16 shows the layer 621*c* of unifying material after being applied to window pane section 614*c* and shows window pane section 621*a*, with layer 621*a* bonded thereto, removed from window structure 612. As shown in FIG. 15 for window pane sections 614*a* and 614*b* and in FIG. 16 for window pane sections 614*b* and 614*c*, the layers 621*a*, 621*b* and 621*c* are applied to window pane sections 614*a*, 614*b* and 614*c*, respectively, leaving the cracks 618*a* and 618*b* devoid of unifying material. Accordingly, margins are maintained between the layers of unifying material and the corresponding cracks 618*a* and 618*b*, such that each crack 618*a* and 618*b* forms a seam, not covered by the unifying material, at which the window pane sections remain separable and discontinuous from one another. In the procedure illustrated in FIGS. 15 and 16, margins are also maintained between the layers of unifying material and the window frame 616, such that each layer of unifying material is surrounded or circumscribed by a peripheral gap or border of window pane 614 to which unifying material is not applied. The unifying material forms cohesive masses 624*a*, 624*b* and 624*c* for each window pane section, respectively, with each cohesive mass including a layer of unifying material and the corresponding window pane section bonded thereto.

As can be seen from FIG. 15 for hole 642 and from FIG. 16 for crack 618*c*, the hole 642 and the crack 618*c* are patched, plugged, covered or filled in with the unifying material 620 as the layers 621*a* and 621*c* of unifying material 620 are applied, respectively, to the window pane, the unifying material serving to build the perimeter of hole

642 inwardly until the hole is filled. Also, the ends of the grasping members 626 are embedded in the layers of unifying material 620 as the unifying material is applied to the window pane as explained above. A separate patch is not required for hole 642, although a patch may be desirable and/or necessary to cover relatively large holes. Of course, where any or all of the window pane sections are divided into disconnected fragments, such fragments will be unified or bonded together as part of the corresponding cohesive mass.

FIG. 16 illustrates cohesive mass 624*a* removed from the window structure 612, and the cohesive masses 624*a*, 624*b* and 624*c* can be removed, in any of the manners described above, separately and individually from one another, which is particularly advantageous where the weight and/or size of window pane 614 make it undesirable for removal as one piece. If necessary, a glass punch or other suitable tool or implement may be used to separate the window pane sections from window frame 616 and/or the fabrication or construction and, typically, from a track of window structure 612. Where only the grasping members 626' shown in FIG. 14 are provided for each window pane section, the grasping members 626' facilitate removal of the cohesive masses by pulling to the interior side of the window structure. Pulling of the cohesive masses in either direction is possible where grasping members 626 and 626' both are provided, and the cohesive masses can be removed by pushing in either direction, with or without the use of grasping members. Where pre-existing cracks in the damaged window pane do not define separately removable, disconnected sections, the window pane can be formed into a single cohesive mass which can then be separated into separately removable pieces as already explained herein above. It should also be appreciated that layers of unifying material can be applied to the exterior and/or interior surfaces of the window pane sections.

Figure 17:
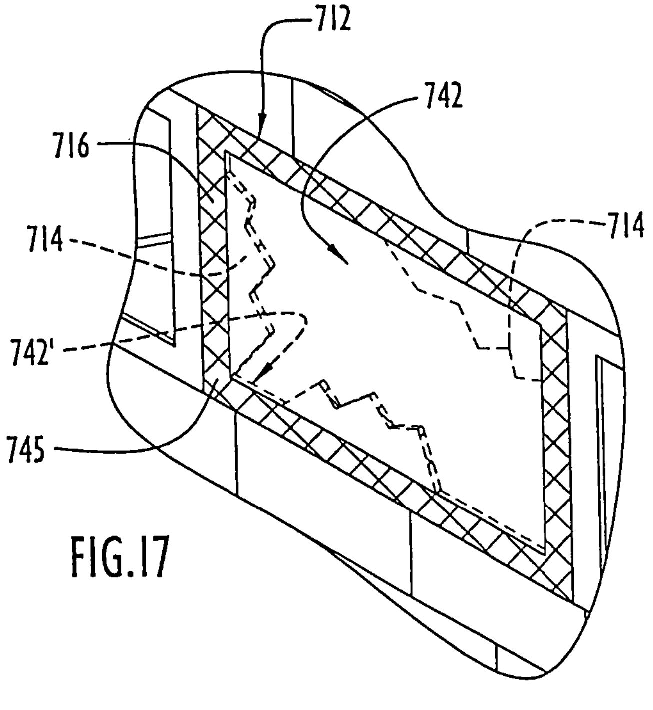
FIG. 17 is a broken, front perspective view of a building including a window structure having a window frame circumscribing an opening entirely or substantially entirely devoid of glass.

In many cases of shattered window panes, the openings circumscribed by the window frames are entirely or substantially entirely devoid of glass so as to present a sizable hole. A window structure 712 in which all of the window pane or glass is missing is shown in FIG. 17. Accordingly, window structure 712 has a hole 742 therein corresponding to the entire opening circumscribed by window frame 716. FIG. 17 also illustrates window structure 712 in the case where substantially all, but not entirely all, of the window pane or glass is missing, in that insubstantial portions of window pane 714 remain in window structure 712 adjacent window frame 716 as shown in dotted lines. Where substantially the entire window pane 714 is missing, the window structure 712 still has a sizable hole 742' shown in dotted lines. Where either hole 742 or 742' is present, the hole is too large to be filled using the unifying material alone. Accordingly, the window structure 712 is stabilized by covering the entire opening with a patch. An optional release element 745 is illustrated in FIG. 17 disposed over the exterior surface of window frame 716 and may include any of the release elements previously described above.

Figure 18:
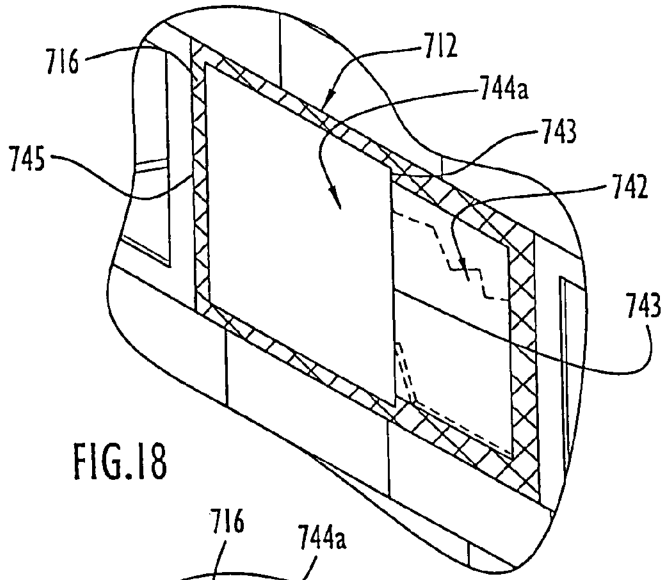
FIG. 18 is a broken, front perspective view of the building of FIG. 17 showing a first patch member secured over a portion of the opening.
Figure 19:
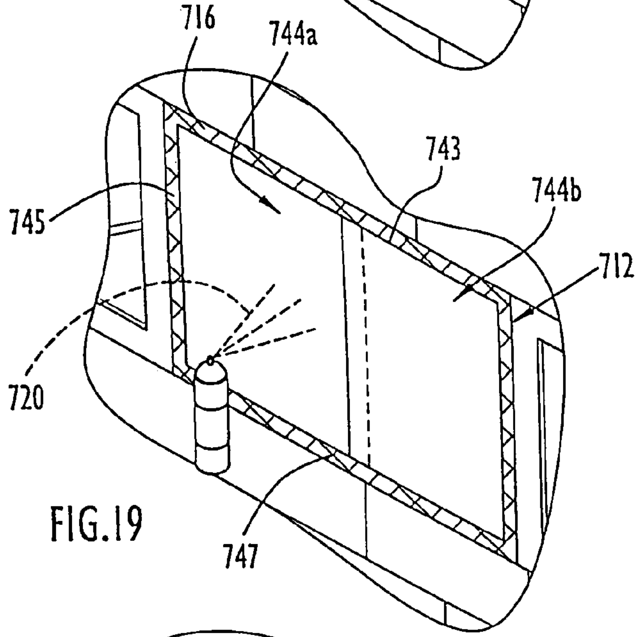
FIG. 19 is a broken, front perspective view of the building of FIG. 18 illustrating a second patch member secured over the remainder of the opening to form a patch covering the entire opening and depicting a layer of unifying material being applied over the patch.

The procedure for stabilizing window structure 712 is similar for holes 742 and 742', and is described herein for hole 742. The procedure described herein utilizes two patch members to cover respective portions of the opening; however, any number of patch members of various geometric configurations and sizes may be utilized. FIG. 18 illustrates a first patch member 744*a* having an adhesive backing 743 and being secured via the adhesive backing to the exterior surface of frame 716 such that the patch member 744*a* covers the entire height of the opening and a little more than half the width of the opening. The top edge, bottom edge and left side edge of patch member 744*a* are adhesively secured to window frame 716 and/or to release element 745 along the top, bottom and left sides of window frame 716. The patch member 744*a* partially overlaps the window frame 716 and/or release element 745 along the top, bottom and left sides of window frame 716 such that a gap or border of window frame 716 and/or release element 745 is exposed along the top, bottom and left side edges of patch member 744*a*. The right side edge of patch member 744*a* spans the opening from top to bottom. A second patch member 744*b* having an adhesive backing 743 is secured to the exterior surface of window frame 716 such that the second patch member 744*b* covers the entire height of the opening and the remaining uncovered width of the opening as shown in FIG. 19. The second patch member 744*b* has top, bottom and right side edges adhesively secured to window frame 716 and/or to release element 745 along the top, bottom and right sides of window frame 716. The patch member 744*b* has a left side edge that overlaps the right side edge of patch member 744*a* and is adhesively secured thereto. The patch member 744*b* partially overlaps the frame 716 and/or the release element 745 along the top, bottom and right sides of frame 716, with a gap or border of frame 716 and/or release element 745 exposed along the top, bottom and right side edges of patch member 744*b*. The adjacent patch members 744*a* and 744*b* form a patch having a peripheral edge continuously secured to the window frame along the top, bottom, left and right sides of the window frame, and a peripheral gap or border 747 of window frame 716 and/or release element 745 is disposed around the periphery of the patch. Where some glass is present in the opening, as shown in the case of the hole 742', the patch may be adhered to the glass if it is feasible to do so. Once the entire opening is covered by the patch, a body of unifying material 720 is applied over the patch as also shown in FIG. 19.

Figure 20:
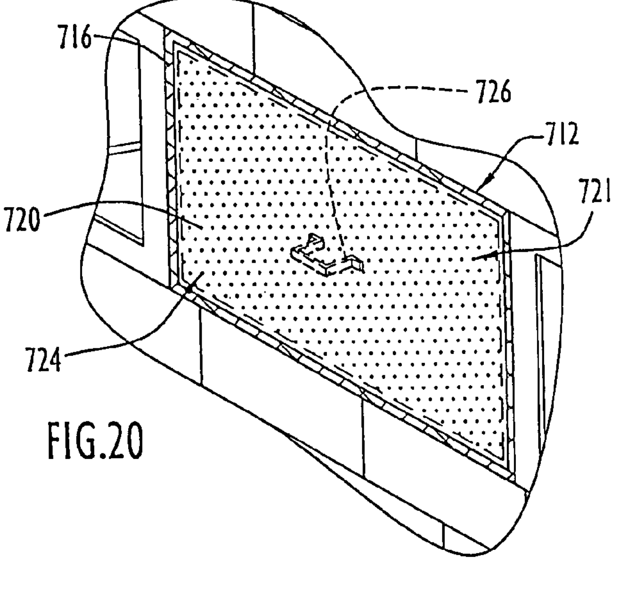
FIG. 20 is a broken, front perspective view of the building of FIG. 19 subsequent to application of the layer of unifying material over the patch to form a cohesive mass therewith.

As shown in FIG. 20, the unifying material 720 is applied over the patch as a layer 721 to form cohesive mass 724 including layer 721 and the patch members 744*a* and 744*b*, shown in FIG. 19, bonded thereto. Preferably, the layer 721 covers the entire peripheral edge of the patch for an enhanced seal. In the illustrated procedure, the layer 721 overlaps the peripheral margin 747 of window frame 716 and/or release element 745 partially or entirely. Of course, more than one layer of unifying material can be provided over the patch, and one or more layers of unifying material can be provided on the exterior and/or the interior sides of the patch. The window structure 712 is stabilized in FIG. 20, with the cohesive mass 724 providing structural integrity and a barrier between the exterior and interior sides of the window structure. The cohesive mass 724 may remain in place until an intact window pane can be installed in frame 716.

The stabilized window structure and method depicted by FIGS. 18–20 are applicable to any of the fabrications or constructions described above, including vehicles. In addition to stabilizing window structures in which window panes are missing due to damage, the method illustrated in FIGS. 18–20 is useful for covering unprotected openings in fabrications, such as buildings, under construction. In the latter case, openings in buildings or other fabrications under construction can be closed off to protect the interior until a window or other intended architectural component can be installed in the opening. The release element 745, where present, may be designed to allow the adhesive backing 743 and/or the layer 721 of unifying material 720 to adhere to the window frame 716 with sufficient force to avoid undesired detachment or separation of the cohesive mass from the frame 716, while permitting the cohesive mass to be forcefully separated or detached from the frame 716 for removal of the cohesive mass without significant damage to the window frame. The cohesive mass 724 can be removed in any of the manners described above. Where the patch has been adhered to glass present in the opening, the glass will become part of the cohesive mass and will be removed therewith. Where the patch has not been adhered to glass present in the opening, such that some glass remains in the opening upon removal of the cohesive mass 724, a body of unifying material can be applied to the remaining glass to form a cohesive mass therewith which can then be removed from the window structure.

It should be understood that the patch members 744*a* and 744*b* can be removably secured or attached to the window frame 716 using the unifying material as an adhesive as previously described for window structure 412. Accordingly, a quantity of unifying material 720 can be applied to window frame 716 and, thereafter, the patch members 744*a* and 744*b* can be positioned to cover the opening with the patch members secured to the window frame using the unifying material as an adhesive. Prior to this step, the window frame can be protected, if necessary, using a release element. Where the unifying material is used to removably secure the patch to the window frame, the unifying material can be applied to the window frame as a continuous peripheral band around hole 742 or as a plurality of individual, discrete deposits of material located at any suitable locations on frame member 716. Where some glass is present in the window frame, the unifying material optimally is applied to this glass and the patch is secured thereto using the unifying material as an adhesive. Of course, adhesives other than the unifying material can be applied to the window frame to removably secure the patch thereto. Where the patch members are provided with an adhesive backing, the adhesive backing may cover the entire back surfaces of the patch members or a portion or portions of the back surfaces which come in contact with the window frame. Also, it should be appreciated that the patch and layer of unifying material can be applied to the exterior and/or interior sides of window structure 712. Grasping members can be secured to the cohesive mass 724 in any manner, such as being attached directly to the patch and/or the layer of unifying material, as shown in dotted lines by grasping member 726. A layer of material of any type can be secured over the layer of unifying material for additional protection, structural strength and/or enhanced visual appearance.

Figure 21:
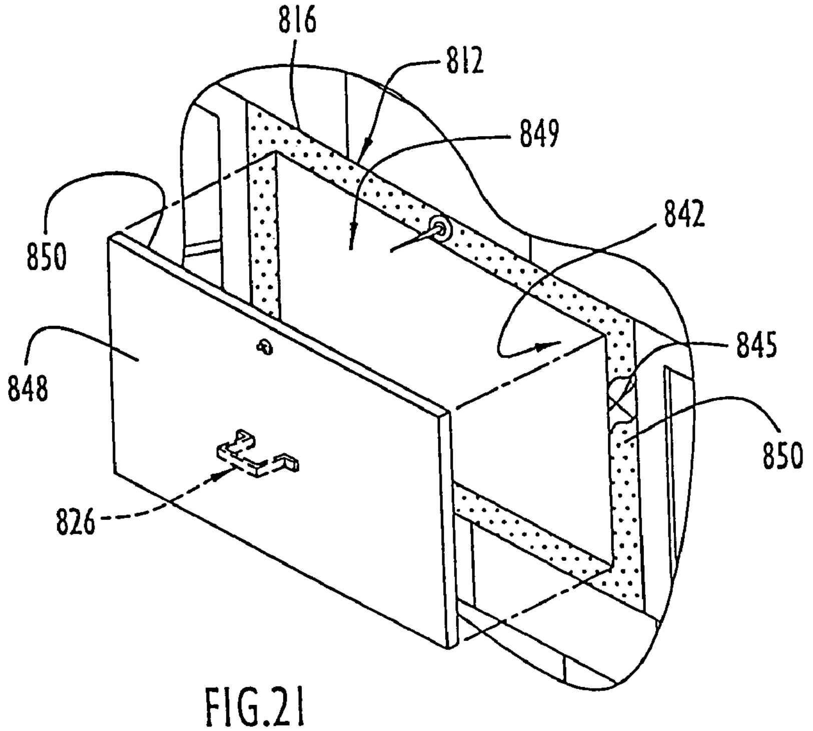
FIG. 21 is a broken, front perspective view of a building including a window structure having a window frame circumscribing an opening entirely or substantially entirely devoid of glass and illustrating stabilization of the window structure via a pre-formed polymeric foam panel secured over the opening.

A modified stabilized window structure 812 is illustrated in exploded perspective view in FIG. 21. Window structure 812 is similar to window structure 712 and has window frame 816 circumscribing an opening entirely or substantially entirely devoid of glass to present a sizable hole 842. Window structure 812 is stabilized by covering the opening with a pre-formed, pre-fabricated panel 848 made of polymeric material which is lightweight and inexpensive and, preferably, made of polymeric foam material. In the stabilized window structure 812, the panel 848 is removably secured over window frame 816 via a backing of adhesive 850 on at least a peripheral portion of the back surface of panel 848. However, the adhesive 850 could alternatively and/or additionally be applied to the window frame 816. The adhesive 850 is preferably strong enough to secure the panel 848 on the window frame 816 so long as the panel 848 is intended to remain in place over the opening, while allowing the panel to be forcefully removed or detached from the window structure without significant damage to the window structure. If needed, the exterior surface of window frame 816 to which the panel 848 is secured can be protected with a suitable release element 845. The panel 848 can alternatively and/or additionally be removably secured to the window structure using one or more mechanical securing devices 849. Suitable pre-formed panels, securing devices and manners of securing the panels to window structures are disclosed in Applicant's prior U.S. patent application Ser. No. 09/878,214 previously incorporated herein by reference. Of course, it should be appreciated that the panel 848 can be secured on the interior or exterior sides of the window structure, and a panel 848 can be secured on each of the interior and exterior sides of the window structure. The panel 848 can easily be cut to fit the window frame 816, and may include one or more grasping members 826. The grasping members 826 may be secured to the panel 848 by a user or may be secured to the panel 848 as part of the manufacturing process. The panel 848 is left in place to stabilize window structure 812 until replacement glass can be installed. Once replacement glass is ready to be installed in the opening, the panel 848 is removed from the window structure by detaching it from window frame 816. If needed, a knife or any suitable tool can be used to facilitate separation of the panel from the window frame. If some glass is present in the opening, a body of unifying material can be applied to the glass to form a cohesive mass therewith which can then be removed from the window structures.

In any of the stabilized window structures described above, a protective member may be secured to the glass around the peripheral edge of the cohesive mass for the purpose of preventing or inhibiting a glass shard from piercing the unifying material in the event that the cohesive mass is subjected to considerable force. The cohesive mass would thusly be protected if a person or object forcefully impacted the cohesive mass. The protective member could include a film or sheet of polymeric or cellulosic material, a metal structure or mesh, or a film or sheet of any other material having protective or barrier characteristics. The protective member can be secured to the glass, the cohesive mass and/or the window frame in any various ways including use of the unifying material as an adhesive for the protective member. A protective member is not likely to be needed in most cases, but may be useful for window structures located at a ground floor or elevation.

Figure 22:
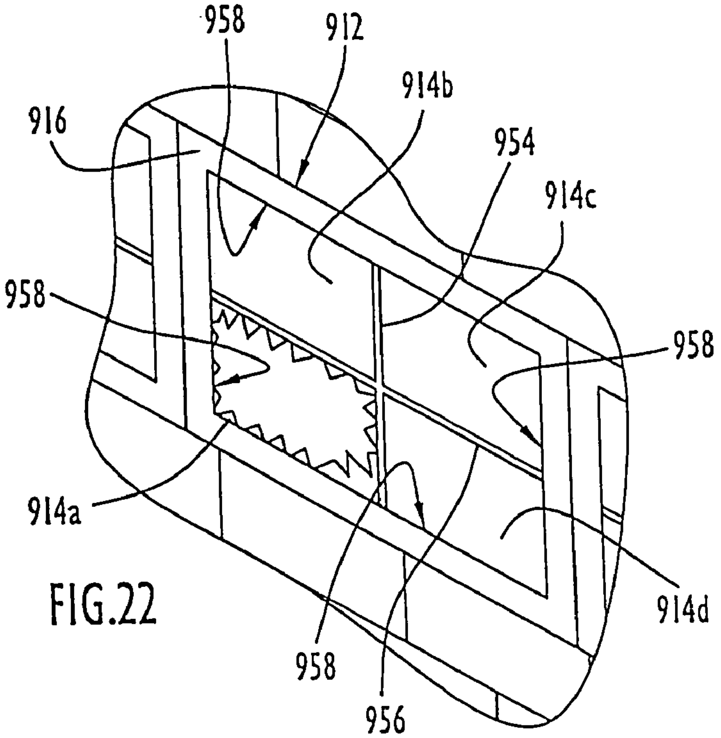
FIG. 22 is a broken, front perspective view of a building including a window structure having a plurality of window panes mounted in tracks, respectively, of the window structure, with one of the window panes being shattered such that fragments protrude from the track of the shattered pane.
Figure 23:
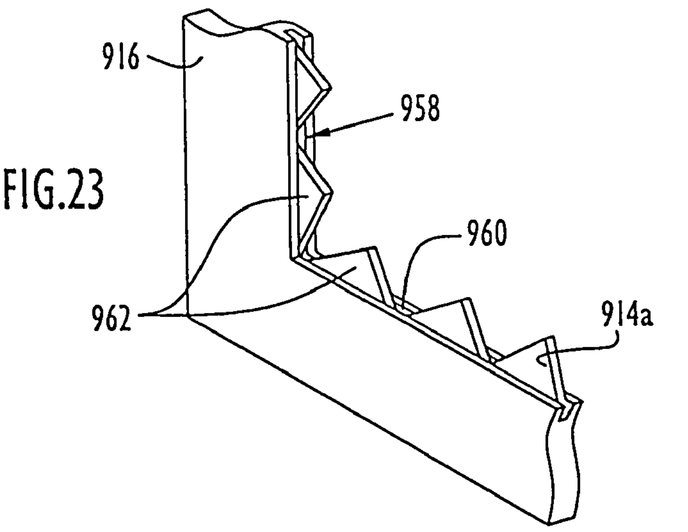
FIG. 23 is a broken, enlarged perspective view of the window structure of FIG. 22 showing the fragments disposed in the track.

FIGS. 22 and 23 illustrate a window structure 912 having a window frame 916 circumscribing an opening and having a vertical mullion 954 and a horizontal mullion 956 dividing the opening into four sections or parts, each receiving a window pane 914*a*, 914*b*, 914*c* and 914*d*, respectively. Each window pane has two vertical sides and two horizontal sides, and is mounted along one of its vertical sides to vertical mullion 954, along one of its horizontal sides to horizontal mullion 956, and along the other of its vertical and horizontal sides to window frame 916. Each window pane is mounted by having its peripheral edge disposed in a track 958 of window structure 912 as best shown in FIG. 23 for window pane 914*a*. The track 958 for each window pane is formed by grooves or slots 960 in window frame 916, vertical mullion 954 and horizontal mullion 956. In the case of window pane 914*a*, for example, the edge of the left vertical side of window pane 914*a* is received in a groove 960 in the left side of frame 916, the edge of the right vertical side of window pane 914*a* is received in a groove 960 in vertical mullion 954, the edge of the top horizontal side of window pane 914*a* is received in a groove 960 in horizontal mullion 956, and the edge of the bottom horizontal side of window pane 914*a* is received in a groove 960 in the bottom side of frame 916, with each groove 960 cooperating to form the track 958 for window pane 914*a*. The arrangement represented by window structure 912 of a window pane mounted in a track of window structure is generally applicable to any type of window structure, with or without mullions, including the window structures described above. The window pane 914*a* is shattered as shown in FIGS. 22 and 23, and comprises shards or fragments 962 of window pane 914*a* jutting from its track 958.

Figure 24:
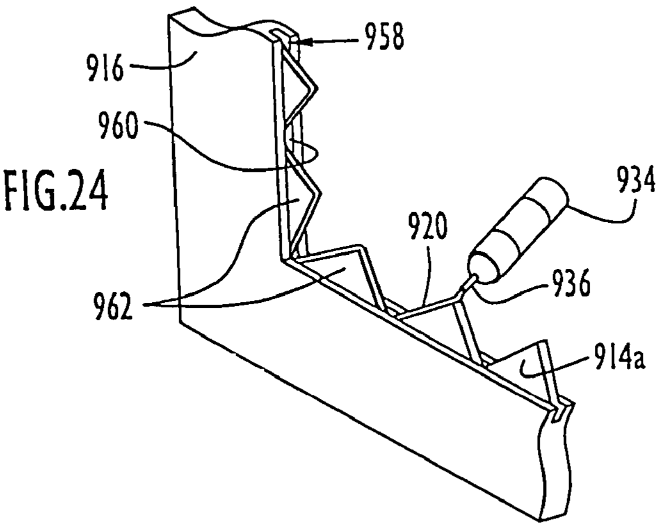
FIG. 24 is a broken, enlarged perspective view of the window structure of FIG. 23 depicting a body of unifying material being applied to the fragments to form the fragments into a cohesive mass.
Figure 25:
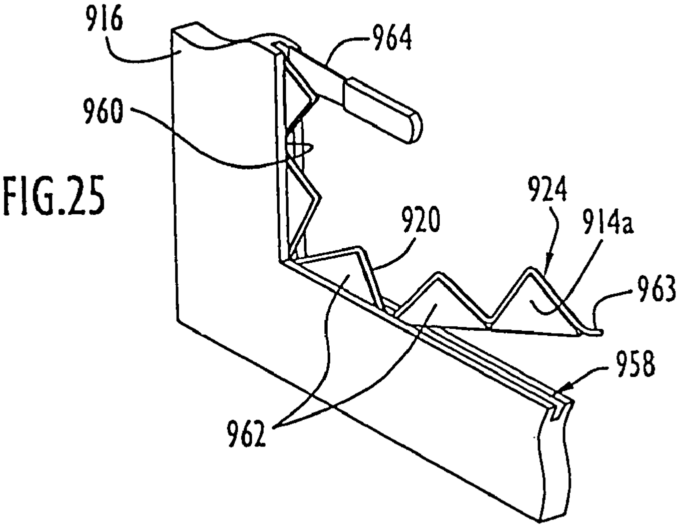
FIG. 25 is a broken, enlarged perspective view of the window structure of FIG. 24 illustrating removal of the fragments with the cohesive mass.

A method for safely removing the window pane fragments 962 from track 958 is shown in FIGS. 24 and 25. FIG. 24 illustrates a body of unifying material 920 being applied to the fragments 962 as a band, strip or bead extending along track 958 for window pane 914*a*. In particular, FIG. 24 shows the body of unifying material 920 being applied to the fragments 962 disposed in the groove 960 in the left and bottom sides of frame 916, and the unifying material is applied in a similar manner to the fragments disposed in the grooves of the horizontal and vertical mullions. The unifying material 920 is applied from a container 934 using a narrow band nozzle 936, and the unifying material may be applied in a continuous or unbroken band, strip or bead of desired length. If desired or necessary, the track 958 and/or window frame 916 can be protected by applying a release element thereto to prevent or inhibit bonding of the unifying material to the track and/or the window frame. Upon drying, setting, hardening, rigidifying or curing, the unifying material 920 forms a cohesive mass 924 including the unifying material 920 and the fragments 962 bonded thereto as shown in FIG. 25. The cured unifying material covers the sharp edges and/or points of the shards and thusly protects against injury or damage. The cohesive mass 924 can then be withdrawn from the window structure 912, with the fragments 962 being removed from the track 958 as the cohesive mass 924 is withdrawn. The cohesive mass 924 can be withdrawn or removed in any suitable manner, such as by grasping and pulling an end 963 of the band, strip or bead to pull the cohesive mass away from the frame 916 so that the fragments are extracted from the track 958. Prior to removing the cohesive mass 924, the fragments 962 can be separated from the track 958 by inserting a knife 964 or other tool into the groove 960 to break the adhesive bond between the window pane and its track as typically found in many conventional window structures. All of the fragments 962 for window pane 914*a* can be removed as part of a single, continuous band, strip or bead of unifying material, i.e., a single cohesive mass, as a plurality of pieces of the single cohesive mass, or as a plurality of separately removable cohesive masses. Pieces of the single cohesive mass can be obtained by cutting the cohesive mass into separate pieces. Separately removable cohesive masses may be obtained by applying the unifying material in separate, disconnected bands, strips or beads to form separate cohesive masses utilizing pre-existing cracks or breaks between adjacent shards to delineate the separate cohesive masses.

Figure 26:
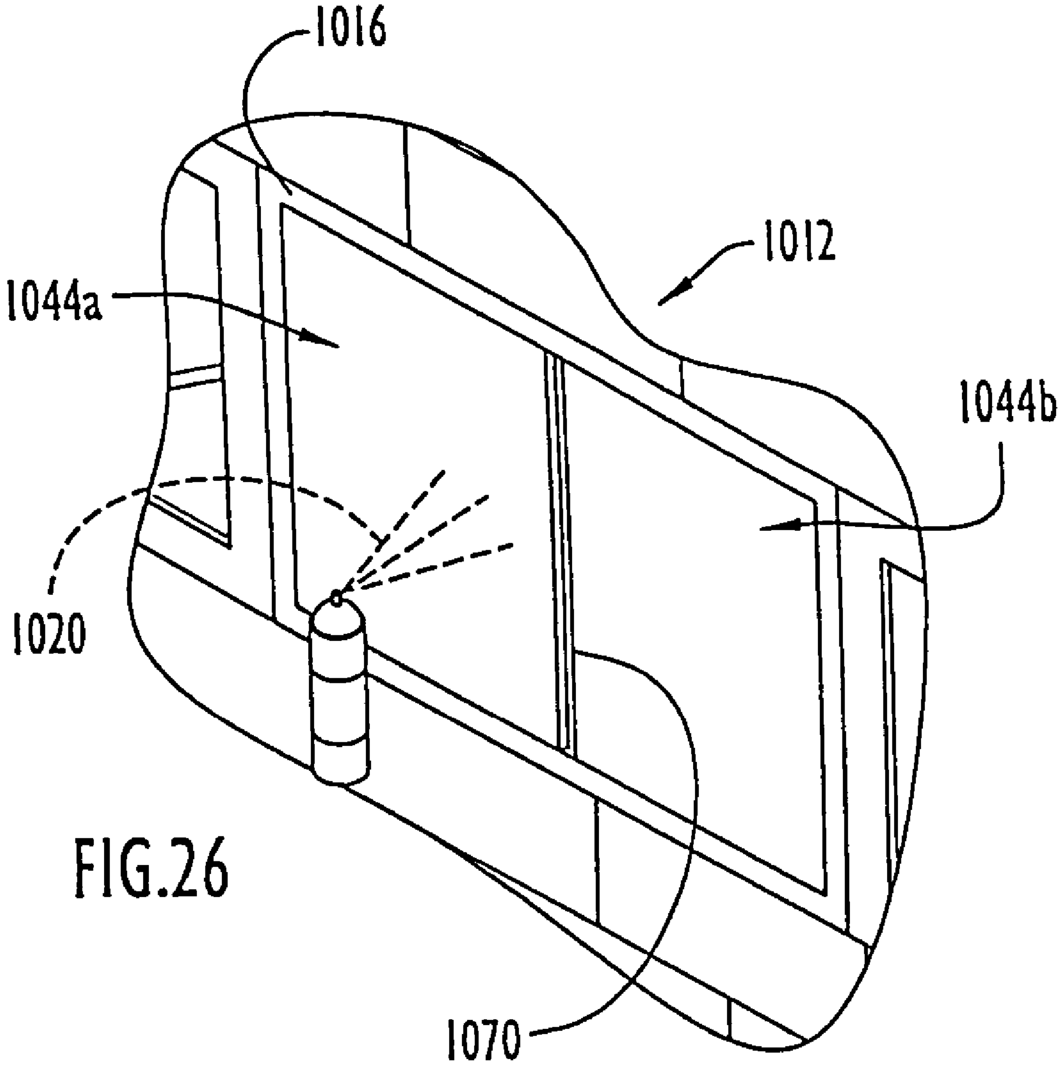
FIG. 26 is a broken, front perspective view of a building depicting stabilization of a window structure utilizing a body of unifying material applied over a plurality of pre-formed polymeric foam patch members with the unifying material bridging a seam between adjacent patch members.

FIG. 26 is representative of a stabilized window structure and method of stabilizing a window structure wherein pre-formed panels of polymeric foam material are used as patch members, and wherein the patch members are disposed over an opening of the window structure without being placed in overlapping arrangement. Window structure 1012 illustrated in FIG. 26 includes window frame 1016 circumscribing an opening entirely or substantially entirely devoid of glass. First and second patch members 1044*a* and 1044*b* are secured over frame 1016 to cover the opening in its entirety, and each patch member 1044*a* and 1044*b* is a pre-formed panel made of polymeric foam as described above for panel 848. Patch members 1044*a* and 1044*b* are secured to frame member 1016 as described for patch members 744*a* and 744*b*, except that patch members 1044*a* and 1044*b* are closely juxtaposed to one another without overlapping. Accordingly, the right side edge of patch member 1044*a* is close to or in abutment with the left side edge of patch member 1044*b* to form a seam 1070 between the adjacent patch members. A body of unifying material 1020 is applied over the exterior and/or interior sides of the patch formed by patch members 1044*a* and 1044*b* to form a cohesive mass therewith. The unifying material is applied to the seam 1070 between the adjacent patch members and forms an adhesive and/or mechanical bond that bridges the seam when the unifying material has cured. Although the unifying material may desirably be applied over the entire or substantially the entire surface area of the patch, the quantity of unifying material applied to the patch may be minimized in that it may only be necessary to apply the unifying material to the seam. The patch members 1044*a* and 1044*b* may be removably secured to frame 1016 adhesively, including use of the unifying material as the adhesive, and/or mechanically using mechanical securing devices as described for panel 848.

The present invention may be used to stabilize and/or to remove glass or panes from windows, walls, doors or any other architectural component in buildings, vehicles and any other fabrications or constructions. The present invention may be used on planar and non-planar panes of various types. In accordance with the present invention, a shattered, broken or cracked window pane is bonded with a layer of unifying material into one or more cohesive, integral masses which can be controllably removed from a window frame as one or more integral and unitary pieces. The layer of unifying material quickly bonds or adheres to the window pane, such that the window pane is stabilized and may be removed shortly after the layer of unifying material is applied. The relatively quick cure time for the unifying material makes the present invention particularly well suited for stabilizing and/or removing window panes in time critical situations. Holes, openings or voids in window panes can be covered and sealed in accordance with the present invention, with or without the use of a patch. However, a patch may be useful for closing off and sealing relatively large holes which would be difficult to fill with the unifying material alone, as in the case of window structures in which all or substantially all of the glass is missing therefrom. The layer of unifying material may be pre-formed or may be formed in situ as a result of applying the unifying material to the window structure. The layer of unifying material is resistant to environmental elements and, if desired, may be safely left in place for some time after application to the window structure. Where adhesives are utilized in accordance with the present invention, the unifying material can be used as the adhesive.

Removal of a window pane or glass in accordance with the present invention ensures that fragments of the window pane or glass are removed as part of a cohesive mass and are not separated or scattered during removal and disposal. Accordingly, the need to collect and dispose of any scattered pieces of the window pane is eliminated. Even where the cohesive mass is removed as a plurality of relatively large pieces, the pieces are not injurious due to their large size and the protection provided by the layer of unifying material. Shattered window panes can be removed as a plurality of cohesive masses using pre-existing cracks in the panes to define or demarcate the cohesive masses. A shattered window pane can be handled as if it were one or a few relatively large, solid pieces and may be handled as if it was not shattered. In addition, handling of the cohesive mass or masses can be further facilitated with the use of grasping members. The present invention also allows shards to be removed from a track of a window structure as part of a cohesive mass, thereby avoiding the tedious and dangerous process of picking the shards out of the track individually. The stabilized window structures and methods of the present invention save time, money, labor and materials, and provide enhanced versatility for users to self-customize for particular applications. The present invention fulfills many previously unmet needs of glass professionals, do-it-yourself users, property owners, builders, construction workers and fire, police and medical personnel.

Inasmuch as the present invention is subject to various modifications and additions, the preferred embodiments are intended to be exemplary only and not limiting since various modifications, variations and changes can be made thereto without departing from the scope of the invention as defined by the appended claims.

What is claimed is:

1. A method of removing a shattered glass pane disposed in a frame and having one or more cracks dividing the pane into a plurality of separate, disconnected pane sections, said method comprising the steps of applying a body of unifying material to at least one of an exterior surface or an interior surface of each pane section leaving the one or more cracks uncovered by the unifying material;

bonding the unifying material to each pane section to form a separate cohesive mass for each pane section including the body of unifying material and the pane section bonded thereto; and removing the cohesive masses from the frame separately from one another.

2. A method of removing a shattered glass pane as recited in claim 1 wherein said step of applying includes applying a layer of polymeric foam to each pane section.

3. A method of removing a shattered glass pane as recited in claim 2 wherein said step of applying includes applying the polymeric foam in fluidic form and said step of bonding includes allowing the unifying material to cure.

4. A method of removing a shattered glass pane as recited in claim 1 and further including, prior to said step of removing, the step of attaching at least one grasping member to each cohesive mass to facilitate said step of removing.

5. A method of removing a shattered glass pane as recited in claim 1 wherein said step of applying includes leaving a peripheral border around each body of unifying material at which the unifying material is not applied to the corresponding pane section.

6. A method of removing a shattered glass pane as recited in claim 3 wherein said step of applying includes spraying the polymeric foam in fluidic form.

7. A method of removing a shattered glass pane as recited in claim 6 wherein the only force exerted on the pane sections due to said step of applying is from the polymeric foam itself.

* * * * *